United States Patent
Nguyen et al.

(10) Patent No.: US 12,435,148 B2
(45) Date of Patent: Oct. 7, 2025

(54) COMPOSITIONS AND METHODS TO BLOCK AND BIND CXCR4 TO MODULATE CELLULAR FUNCTION

(71) Applicant: The Research Foundation for The State University of New York, Amherst, NY (US)

(72) Inventors: Juliane Nguyen, Buffalo, NY (US); Michael Deci, Amherst, NY (US)

(73) Assignee: The Research Foundation for The State University of New York, Amherst, NY (US)

( * ) Notice: Subject to any disclaimer, the term of this patent is extended or adjusted under 35 U.S.C. 154(b) by 942 days.

(21) Appl. No.: 17/626,477

(22) PCT Filed: Jul. 13, 2020

(86) PCT No.: PCT/US2020/041819
§ 371 (c)(1),
(2) Date: Jan. 11, 2022

(87) PCT Pub. No.: WO2021/011480
PCT Pub. Date: Jan. 21, 2021

(65) Prior Publication Data
US 2022/0281986 A1      Sep. 8, 2022

Related U.S. Application Data

(60) Provisional application No. 62/873,665, filed on Jul. 12, 2019.

(51) Int. Cl.
*C07K 16/28* (2006.01)
*A61P 35/00* (2006.01)
*C07K 14/46* (2006.01)

(52) U.S. Cl.
CPC .......... *C07K 16/2866* (2013.01); *A61P 35/00* (2018.01); *C07K 14/46* (2013.01); *C07K 2317/21* (2013.01); *C07K 2317/33* (2013.01); *C07K 2317/56* (2013.01); *C07K 2317/622* (2013.01); *C07K 2317/76* (2013.01); *C07K 2317/94* (2013.01)

(58) Field of Classification Search
CPC ...... C07K 14/46; C07K 16/2866; A61P 35/00
See application file for complete search history.

(56) References Cited

U.S. PATENT DOCUMENTS

| 2011/0250165 A1* | 10/2011 | Marasco | A61P 37/06 |
| | | | 530/387.3 |
| 2013/0129752 A1* | 5/2013 | Peer | C12N 15/111 |
| | | | 435/375 |
| 2017/0037130 A1 | 2/2017 | Raum et al. | |
| 2018/0072813 A1 | 3/2018 | Marasco et al. | |
| 2018/0127502 A1 | 5/2018 | Brentjens et al. | |

FOREIGN PATENT DOCUMENTS

| WO | 2016/130986 A1 | 8/2016 |
| WO | 2019/126538 A1 | 6/2019 |
| WO | 2020/232127 A1 | 11/2020 |

OTHER PUBLICATIONS

NCI Thesaurus, Accessed Feb. 13, 2025, https://ncithesaurus.nci.nih.gov/ncitbrowser/pages/concept_details.jsf?dictionary=NCI_Thesaurus&code=C28774 (Year: 2025).*

Sloane, A.J., et al., Marked structural and functional heterogeneity in CXCR4: Separation of HIV-1 and SDF-1α responses, Immunology and Cell Biology, Feb. 28, 2005, vol. 83, pp. 129-143.

Dzlembowska, M., et al., A Role for CXCR4 Signaling in Survival and Migration of Neural and Oligodendrocyte Precursors, GLIA, vol. 50, No. 3, pp. 258-269.

Deci, M.B., et al., Carrier-Free CXCR4-Targeted Nanoplexes Designed for Polarizing Macrophages to Suppress Tumor Growth, Cellular and Molecular Bioengineering, Aug. 27, 2019, vol. 12, No. 5, pp. 375-388.

* cited by examiner

*Primary Examiner* — Janet L Epps -Smith
*Assistant Examiner* — Nada Ahmed Mahmou Elmansy
(74) *Attorney, Agent, or Firm* — Hodgson Russ LLP

(57) ABSTRACT

Provided are composition comprising antibodies directed to the N-terminal domain of CXCR4. The antibody may be a scFv and can be fused to a RNA binding peptide. The fusion protein can be complexed to RNAi, such as micro RNA. The complexes can be used for targeting delivery of RNAi molecules to CXCR4 expressing cancer cells, as well as inhibiting the binding of CXCR4 to CXCL12.

6 Claims, 16 Drawing Sheets

Specification includes a Sequence Listing.

Figure 1

| | $V_L$FR1 | $V_L$CDR1 | $V_L$FR2 | $V_L$CDR2 | $V_L$FR3 | $V_L$CDR3 | $V_L$FR4 | Linker | scFv#a  SYELTQPPSASGTPGQRVTISCSGSSSNIGSNYVYWYQQLPGTAPKLLIYRNNQRPSGVPDRFSGSKSGTSASLAISGLRSEDEADYYCAAWDDSLNGVVFGGGTKLTVLGEGKSSGSGS
scFv#b  QSVLTQPPSASGTPGQRVTISCSGSSSNIGSNYVYWYQQLPGTAPKLLIYRNNQRPSGVPDRFSGSKSGTSASLAISGLRSEDEADYYCAAWDDSLSGVIFGGGTKLTVLGEGKSSGSGS
scFv#c  QSVLTQPPSASGTPGQRVTISCSGSGSSSNIGSNYVYWYQQLPGTAPKLLIYRNNQRPSGVPDRFSGSKSGTSASLAISGLRSEDEGDYYCATWDDSLSGVVFGGGTKLTVLGEGKSSGSGS
scFv#d  QSVLTQPPSASGTPGQGITISCSGSGSGSNIGSHTVSWYQQLPGTAPKLLIYGNNNRPSGVPDRFSGSKSGTSATLGITGLQTGDDADYYCATWDTGPSAVVFGGGTKLTVLGEGKSSGSGS

| Linker contd | $V_H$FR1 | $V_H$CDR1 | $V_H$FR2 | $V_H$CDR2 | $V_H$FR3 | $V_H$CDR3 | $V_H$FR4 | scFv#a  ESKASQVTLKESGAEVKKPGASVKVSCKASGYTFTNFYIHWVRRAPGQGLEWMGIINPSDGRTTYAQKFQGRVTMTRDTSTSTLYMELTSLRSEDTAVCGRGGHYSNYFGQPSTWGQGTLVTVSVEASHHHHHH
scFv#b  ESKASQVTLKESGAEVKKPGASVKVSCKASGYTFTNFYIHWVRRAPGQGLEWMGIINPSDGRTTYAQKFQGRVTMTRDTSTSTLYMELTSLRSEDTAVYYCGRGGHYSNYFGQPSTWGQGTLVTVSVEASHHHHHH
scFv#c  ESKASQVTLKESGAEVKKPGASVKVSCKASGYTFTNFYIHWVRRAPGQGLEWMGIINPSDGRTTYAQKFQGRVTMTRDTSTSTLYMELTSLRSEDTAVYYCGKGGHYSNYFGQPSTWGQGTLVTVSVEASHHHHHH
scFv#d  ESKASQVTLKESGAEVKKPGASVKVSCKASGYTFTNFYIHWVRRAPGQGLEWMGIINPSDGRTTYAQKFQGRVTMTRDASTSTLYMELTSLRSEDTAVYYCGKGGHYSNYFGQPSTWGQGTLVTVSVEASHHHHHH

A

<----------- V<sub>L</sub> FR1 -----------> <-- V<sub>L</sub>CDR1 --> <----- V<sub>L</sub> FR2 -----> <- V<sub>L</sub>CDR2 ->
QSVLTQPPSASGTPGQRVTISC SGSSSNIGSNYVY WYQQLPGTAPKLLIY RNNQRPS <---------- V<sub>L</sub> FR3 ----------> V<sub>L</sub> CDR3 <- V<sub>L</sub> FR4 ->
GVPDRFSGSKSGTSASLAISGLRSEDEGDYYC ATWDDSLSGVV FGGGTKLTVLG Linker <---------- V<sub>H</sub> FR1 ---------->
EGKSSGSGSESKAS QVTLKESGAEVKKPGASVKVSCKASGYTFT V<sub>H</sub> CDR1 <-- V<sub>H</sub> FR2 --> V<sub>H</sub> CDR2 <------ V<sub>H</sub> FR3 ------>
NFYIH WVRRAPGQGLEWMG IINPSDGRTTYAQ KFGRVTMTRDTSTSTLYM V<sub>H</sub> FR3 (cont.) <-- V<sub>H</sub> CDR3 --> <- V<sub>H</sub> FR4 ->
ELTSLRSEDTAVYYCGR GGHYSNYFGQPST WGQGTLVTVSVEASHHHHHH

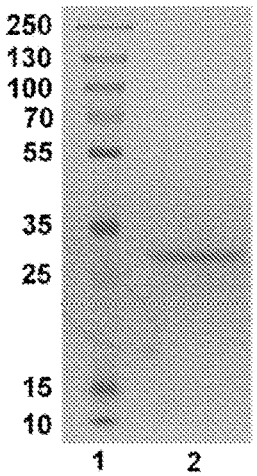

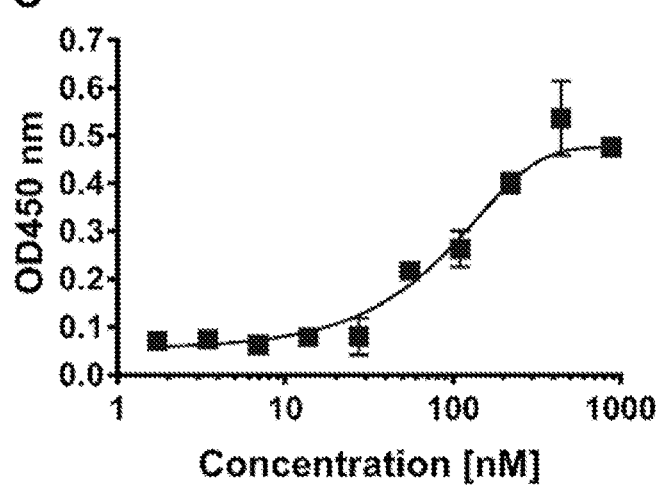

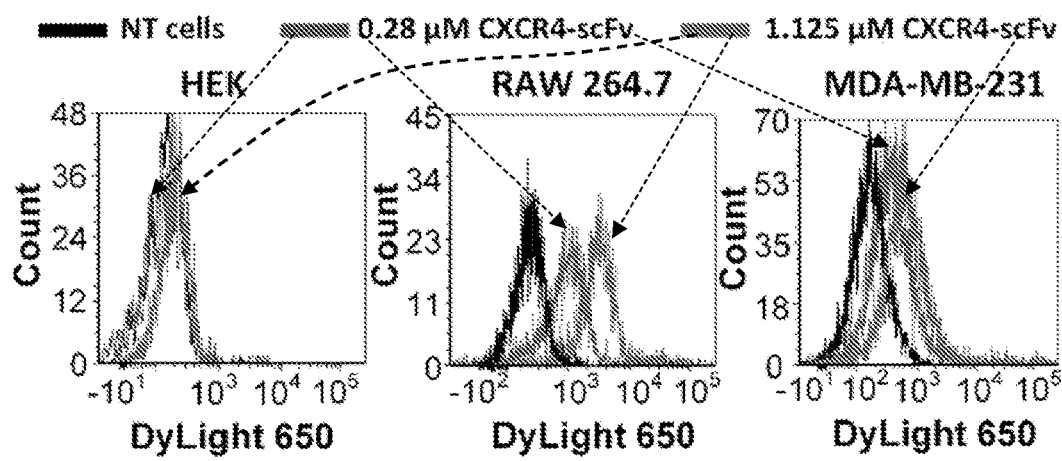

Figure 2

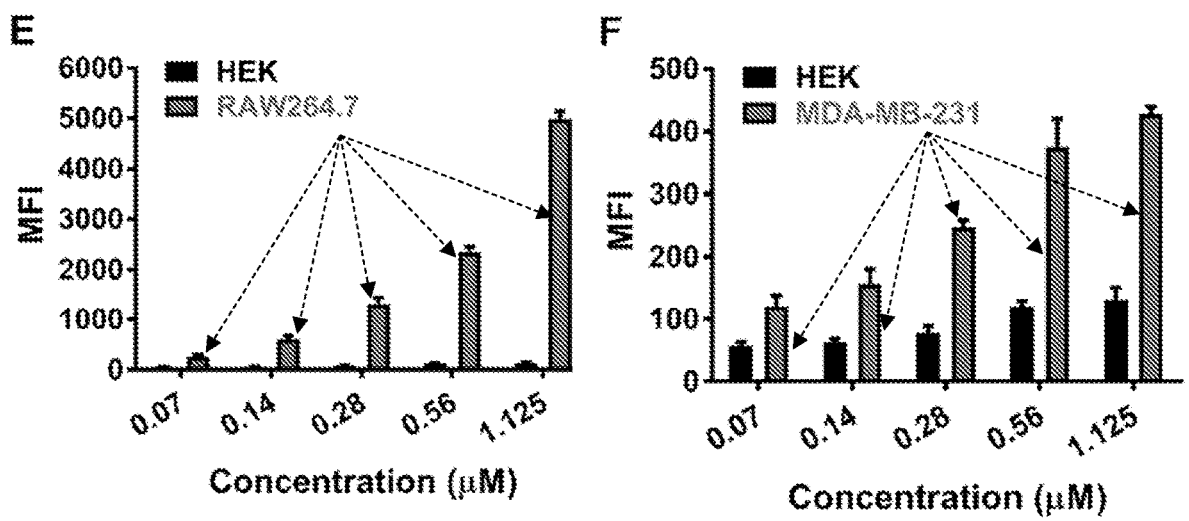
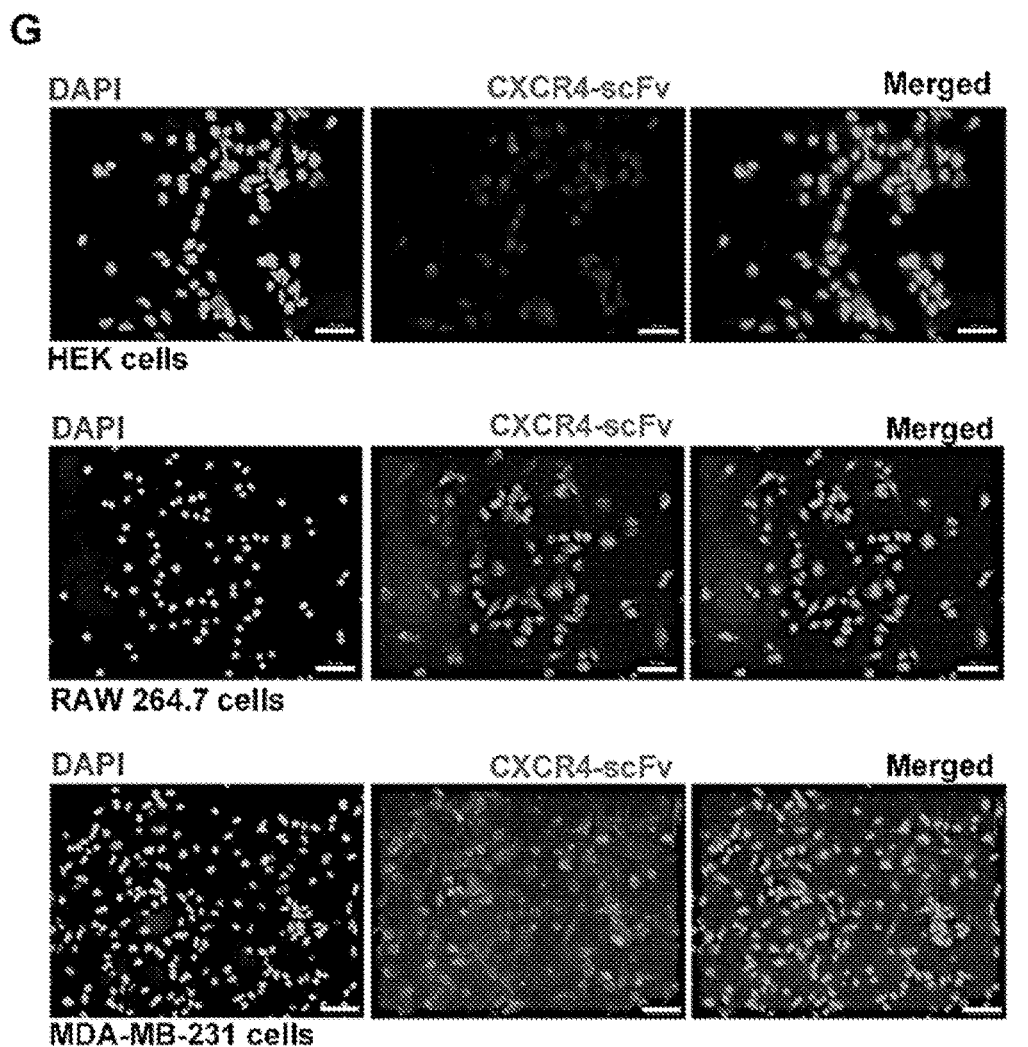
Figure 2 (cont.)

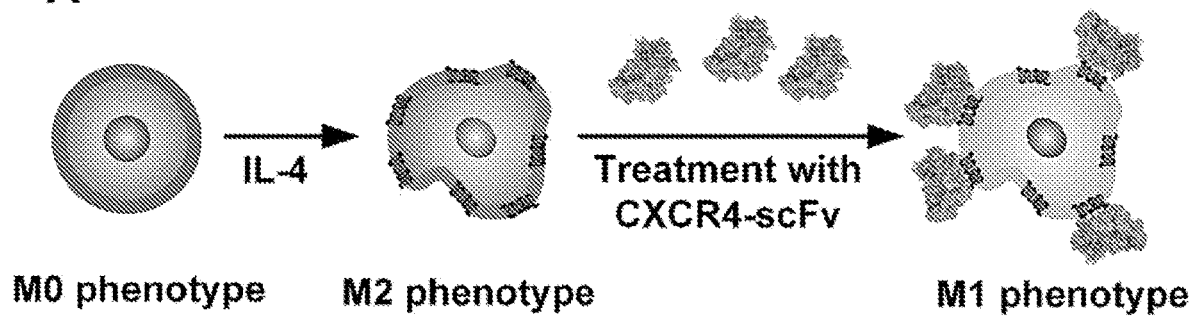
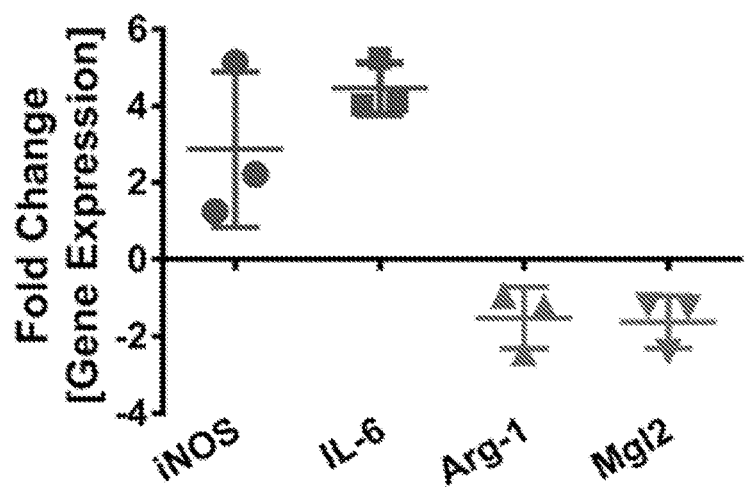
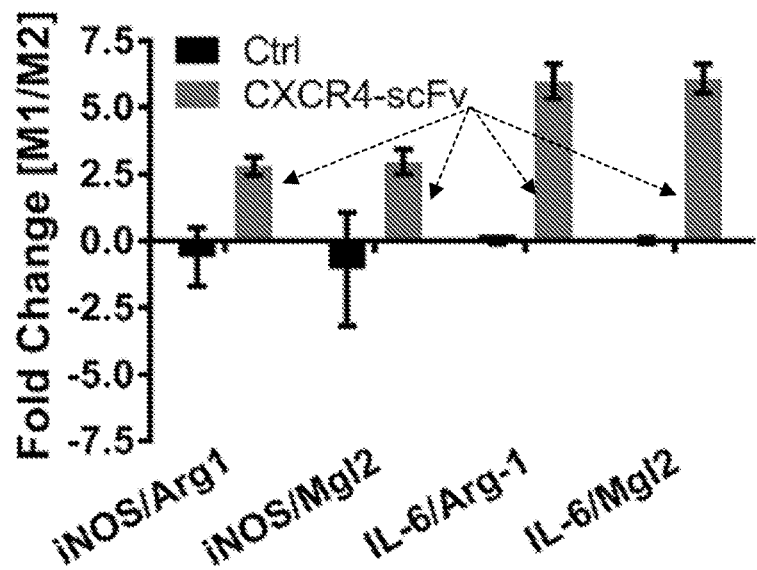
Figure 4

D

| Hydrodynamic Diameter | | | PDI |
|---|---|---|---|
| CXCR4-scFv-RBM/ miR-127 Nanoplexes | Sample 1 | 119.5 ± 56.5 nm | 0.224 |
| | Sample 2 | 115.0 ± 59.6 nm | 0.269 |
| | Sample 3 | 114.7 ± 61.0 nm | 0.283 |
| | Mean + stdev | 116.4 ± 2.7 nm | 0.258 ± 0.03 |

| Zeta Potential | CXCR4-scFv-RBM | CXCR4-scFv-RBM/miR-127 Nanoplexes |
|---|---|---|
| Sample 1 | 3.9 ± 3.0 mV | 0.6 ± 2.2 mV |
| Sample 2 | 6.2 ± 4.7 mV | -2.0 ± 2.5 mV |
| Sample 3 | 4.2 ± 3.2 mV | -0.1 ± 5.2 mV |
| Mean + stdev | 4.8 ± 0.9 mV | -0.5 ± 3.3 mV |

COMPOSITIONS AND METHODS TO BLOCK AND BIND CXCR4 TO MODULATE CELLULAR FUNCTION

CROSS-REFERENCE TO RELATED APPLICATIONS

This application claims priority to U.S. Provisional application No. 62/873,665, filed on Jul. 12, 2019, the disclosure of which is incorporated herein by reference.

STATEMENT REGARDING FEDERALLY SPONSORED RESEARCH

This invention was made with government support under grant nos. EB023262 and EB021454 awarded by the National Institutes of Health. The government has certain rights in the invention.

BACKGROUND OF THE DISCLOSURE

Metastasis is caused by the spread of cancer cells from the primary tumor to surrounding tissues and is the primary cause of death in cancer patients (Seyfried et al., Crit. Rev. Oncog. 18:43-73, 2013). Despite this, few treatments directly target the metastatic spread (Ganapathy et al., J. Control. Release. 219:215-223, 2015). While tumor stroma is considered to play an important role in cancer progression, most anticancer therapies target cancer cells and not the tumor microenvironment (Brown et al., Clin. Cancer Res. 23:3241-3250, 2017; Li et al., J. Cell. Biochem. 101:805-15, 2007). Current chemotherapies also target cellular pathways and enzymes that are over-amplified in tumor cells, but are also present in healthy tissue, generally lead to undesirable side-effects (Cheok et al., Cell Cycle. 11:2227-8, 2012).

CXCR4 is a molecule that is known to mediate cancer cell migration and metastasis through binding the endogenous cytokine CXCL12; and it is not only found on cancer cells but also on cancer stem cells and immune cells, both of which are known to participate in the metastatic process (Furusato et al., Pathol. Int. 60:497-505, 2010). CXCR4 also has less well studied, yet highly important functions with regard to cancer progression, most therapeutically relevant is a role in regulating the two main macrophage phenotypes, M1 and M2 macrophages (Chen et al., J. Hematol. Oncol. 10:36, 2017, Hu et al., Tumor Biology. 37:8657-8664, 2016, Italiani et al., Front. Immunol. 5:514, 2014). The M1-like phenotype has immune stimulating properties that facilitate tumoricidal activity (Deci et al., Mol. Pharm. 15:2721-2731, 2018, Jensen et al., Cancer Immunol Res. 3:881-90, 2015). Conversely, M2-like macrophages are immunosuppressive, anti-inflammatory, and contribute to extracellular matrix remodeling during wound repair (Wynn et al., Immunity. 44:450-462, 2016). Therefore, the balance between these phenotypes in the tumor microenvironment (TME) can influence cancer progression. In general, tumor-associated macrophages (TAMs) are similar to M2 macrophages in that they promote tumor growth and metastasis. CXCL12, the endogenous ligand of CXCR4, upregulates M2-associated genes.

SUMMARY OF THE DISCLOSURE

This disclosure provides compositions and methods where a targeting ligand is used to effect binding to CXCR4 and which by itself also acts as a pharmacological agent. The targeting ligand is an antibody directed against CXCR4. The targeting ligand can polarize macrophages to the tumoricidal M1 phenotype and inhibit migration of cancer cells. The effectiveness of the targeting ligand can be further increased by using it as a delivery vehicle to deliver suitable RNAi molecules (e.g., miRNA, siRNA and the like) to targeted cells. For use as a delivery vehicle, the antibody (such as scFv) can be linked to a RNA binding peptide (e.g., as a fusion protein), which can then be complexed with the small inhibitory RNA. Thus, the antibody against CXCR4 can modulate macrophage polarization by binding to the cell surface receptor CXCR4, while the small RNA can exert its effects through intracellular targets.

In an embodiment, this disclosure provides methods and compositions for blocking CXCR4. Antibodies, RNA binding peptides, miRNAs, compositions, and methods that inhibit CXCL12 from binding to the CXCR4 receptor are provided. The disclosure provides isolated antibodies including fragments and variants thereof. The antibodies can be single chain variable fragment (scFvs) antibodies directed against the N-terminal domain of CXCR4. Binding of these scFvs to CXCR4 inhibits the binding of CXCL12 to CXCR4, thus blocking downstream signaling events. The disclosure also provides compositions comprising the scFvs, and methods of using the scFvs or compositions for inhibiting binding of CXCL12 to CXCR4 for the treatment of a medical condition such as cancer.

In an embodiment, an RNA-binding protamine peptide can be fused to the anti-CXCR4 scFvs. Self-assembling nanoplexes can then be formed by mixing the CXCR4-scFv-protamine fusion protein (CXCR4-scFv-RBM) with inhibitory small RNA molecules, such as, miR-127-5p (miR-127). This disclosure describes that this miRNA mediates macrophage polarization to the M1 phenotype. The disclosure also provides compositions comprising the CXCR4-scFv protamine fusion proteins (CXCR4-scFv-RBM), complexes comprising such proteins, and methods of using the CXCR4-scFv-RBMs or complexes or compositions for inhibiting binding of CXCL12 to CXCR4 and mediating M1 macrophage polarization for the treatment of a condition where inhibition of CXCR4 binding to CXCL12 is desired or helpful.

In an embodiment, the scFvs specifically bind to CXCR4 relative to other chemokine receptors. The scFvs and compositions described in this disclosure can be used for treatment of conditions in which there is abnormal CXCL12/CXCR4 binding resulting in the migration of cancer cells and macrophages and their subsequent polarization to an M2 immune suppressive phenotype. Conditions such as these often arise in diseases such as cancer.

Despite the important role of tumor stroma in cancer progression, the vast majority of anticancer therapies target cancer cells and not the tumor microenvironment. This disclosure provides a therapeutic strategy that not only inhibits inflammatory macrophage migration to the tumor but also polarizes (pushes) tumor associated macrophages (TAMs) towards the tumor-suppressive M1 phenotype and away from the immune-suppressive M2 phenotype by blocking the CXCL12/CXCR4 pathway.

This disclosure also provides a method of treating a tumor in an individual in need of treatment comprising administering to the individual one or more anti-CXCR4 scFvs, anti-CXCR4 scFv-RBM fusion proteins bound with an inhibitory small RNA, such as, miRNA or a composition comprising one or more anti-CXCR4 scFvs and/or anti-CXCR4 scFv-RBM fusion proteins bound with inhibitory small RNA, such as miRNAs (e.g., miR-127). Additionally, this disclosure includes methods and compositions for inhibiting metastasis and/or angiogenesis using the described antibodies and fusion proteins.

BRIEF DESCRIPTION OF THE FIGURES

For a fuller understanding of the nature and objects of the disclosure, reference should be made to the following detailed description taken in conjunction with the accompanying figures.

FIG. 1. Protein sequences of generated CXCR4-scFv antibodies. CDRs are indicated by the labeled, unshaded sequences. FWRs are indicated by the labeled, shaded sequences.

FIG. 2. CXCR4-scFv binds with high affinity to the N-terminal domain (NTD) of the CXCR4 receptor. (A) The CXCR4-scFv protein sequence (SEQ ID NO:3). The framework regions (light ($V_L$ FR) and heavy chains ($V_H$ FR)) and complementarity-determining regions (light ($V_L$ CDR) and heavy chains ($V_H$ CDR)) are highlighted. (B) SDS-PAGE of purified CXCR4-scFv (MW approx. 27.7 kDa) on a 12% gel: ladder (lane 1), CXCR4-scFv sample (lane 2). (C) Binding of the recombinantly expressed CXCR4-scFv to the NTD of CXCR4 as analyzed by ELISA ($K_D$=114±13.9 nM). (D-F) The mean fluorescence intensity (MFI) of the binding between DyLight-labeled CXCR4-scFv and human embryonic kidney cells (HEK), human MDA-MB-231 breast cancer cells, and murine RAW 264.7 macrophages. No binding to CXCR4-negative HEK cells was observed. (G) Fluorescent images of RAW 264.7 cells, MDA-MB-231 cells, and HEK cells treated with DyLight 650-labeled CXCR4-scFv (red). Nuclei were stained with DAPI. Scale bar: 50 µm.

FIG. 4. Effects of the CXCR4-scFv on M1 and M2 markers in RAW 264.7 cells. (A) Schematic of macrophage polarization to the M1 macrophage phenotype through treatment with the CXCR4-scFv. (B) CXCR4-scFv upregulates M1 markers (iNOS and IL-6) and downregulates M2 markers (Arg-1 and Mgl2). (C) Effect of CXCR4-scFv on the M1/M2 ratio expressed as: iNOS/Arg1, iNOS/Mgl2, IL-6/Arg-1, and IL-6/Mgl2.

FIG. 7. Cytotoxicity of CXCR4-scFv-RBM and CXCR4-scFv-RBM/miR-127 nanoplexes on RAW 264.7 cells.

DETAILED DESCRIPTION OF THE DISCLOSURE

Figure 3:
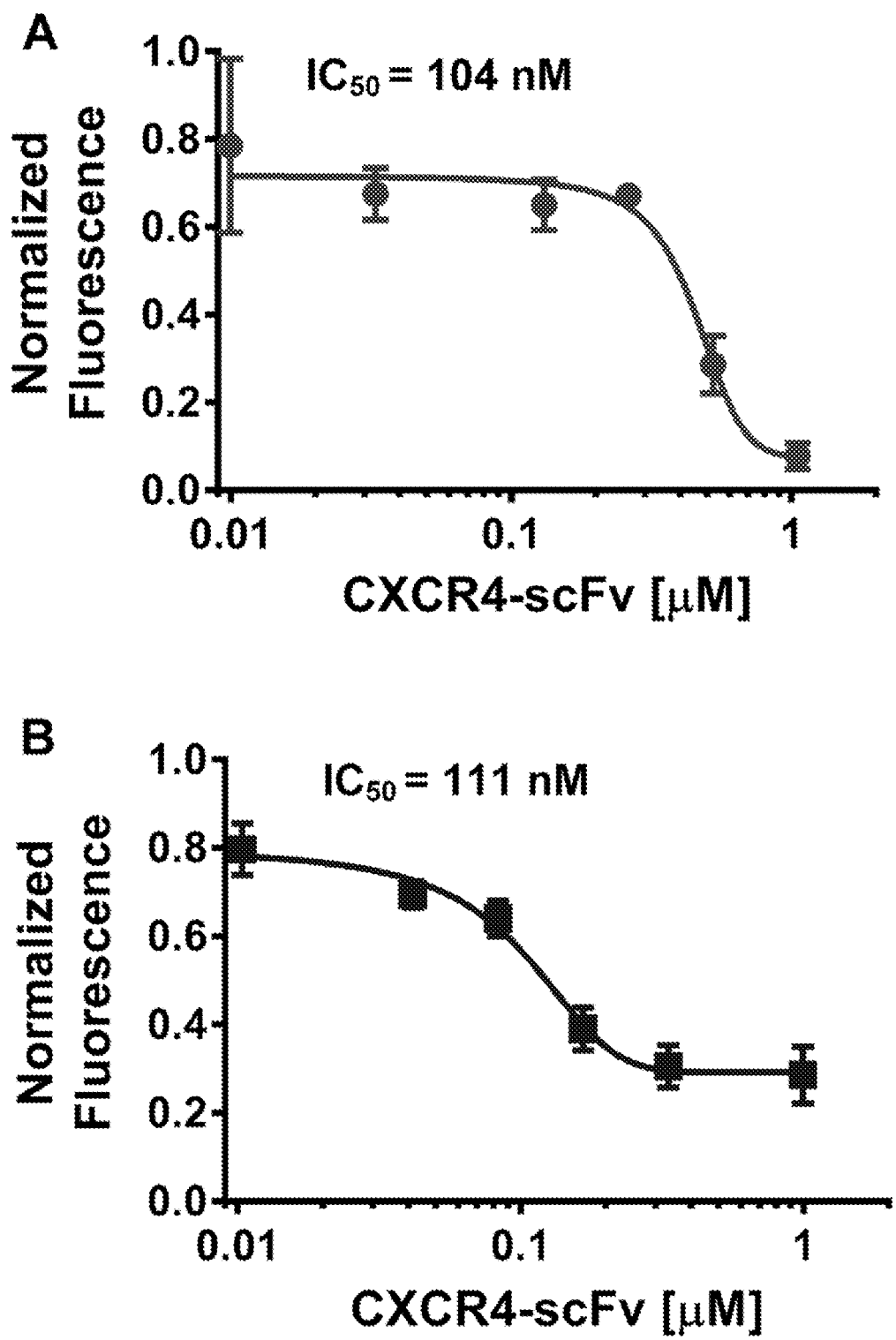
FIG. 3. Inhibition of RAW264.7 and MDA-MB-231 migration induced by CXCL12. (A) Effect of CXCR4-scFv on RAW 264.7 cellular migration in the presence of CXCL12 ($IC_{50}$=104 nM). (B) Effect of CXCR4-scFv on MDA-MB-231 migration in the presence of CXCL12 ($IC_{50}$=111 nM).

Although claimed subject matter will be described in terms of certain embodiments/examples, other embodiments/examples, including embodiments/examples that do not provide all of the benefits and features set forth herein, are also within the scope of this disclosure. Various structural, logical, and process step changes may be made without departing from the scope of the disclosure.

Every numerical range given throughout this specification includes its upper and lower values, as well as every narrower numerical range that falls within it, as if such narrower numerical ranges were all expressly written herein.

Throughout this application, the singular form encompasses the plural and vice versa. All sections of this application, including any supplementary sections or figures, are fully a part of this application.

The term "treatment" as used herein refers to alleviation of one or more symptoms or features associated with the presence of the particular condition or suspected condition being treated. Treatment does not necessarily mean complete cure or remission, nor does it preclude recurrence or relapses. Treatment can be effected over a short term, over a medium term, or can be a long-term treatment, such as, within the context of a maintenance therapy. Treatment can be continuous or intermittent.

The term "therapeutically effective amount" as used herein refers to an amount of an agent sufficient to achieve, in a single or multiple doses, the intended purpose of treatment. The exact amount desired or required will vary depending on the particular compound or composition used, its mode of administration, patient specifics and the like. Appropriate effective amount can be determined by one of ordinary skill in the art informed by the instant disclosure using only routine experimentation.

The present disclosure provides compositions and methods to reprogram macrophage phenotype while targeting cancer cells, instead of solely inhibiting cellular processes that may be necessary for healthy cell function. Compositions and methods are provided that target cancer cells and also tumor associated macrophages (TAMs) within the tumor stroma. CXCR4-positive TAMs have been shown to migrate towards CXCL12-expressing perivascular fibroblasts where they cluster around the tumor vasculature. These TAMs contribute to metastasis and are associated with an increased risk of metastasis and poor clinical outcomes in patients with many types of cancer including breast, ovarian, and pancreatic cancer. The present disclosure provides compositions and methods that interrupt CXCL12/CXCR4-mediated cross-talk between monocytes, TAMs, fibroblasts, and cancer cells, which can effectively prevent metastatic spread and tumor growth.

This disclosure provides compositions comprising a targeting ligand that can bind to CXCR4 and also acts as a pharmacological agent. The targeting ligand is an antibody directed to CXCR4. This targeting ligand can polarize macrophages to the tumoricidal M1 phenotype and inhibit migration of cancer cells. The targeting ligand can be used as a delivery vehicle for delivering RNAi molecules (e.g., short interfering RNA (siRNA), double-stranded RNA (dsRNA), micro-RNA (miRNA, may be referred to herein as miR), and short hairpin RNA (shRNA)) to targeted cells. For use as a delivery vehicle, the antibody (such as scFv) can be linked to a RNA binding peptide (e.g., as a fusion protein), which can then be complexed with the RNAi (e.g., miRNA). Thus, the antibody to CXCR4 can modulate macrophage polarization by binding to the cell surface receptor CXCR4, while the RNAi can exert its effects through intracellular targets. As a result, the present compositions can be useful for reducing tumor cell growth as well as metastasis. In an embodiment, the present compositions comprise, consist essentially of or consist of anti-CXCR4 antibody (or an antigen binding fragment or derivative or variant thereof), or anti-CXCR4 antibody (or an antigen binding fragment or derivative or variant thereof) covalently linked to an RNA binding peptide, or anti-CXCR4 antibody (or an antigen binding fragment or derivative thereof) covalently linked to an RNA binding peptide complexed to RNAi (such as miRNA)—termed here as nanoplexes.

This disclosure provides an antibody or a fragment or derivative or variant thereof against CXCR4. The antibody may inhibit CXCR4 binding to CXCL12. The antibody may be directed against the N-terminal domain of CXCR4. The antibody may be a scFv.

This disclosure provides a fusion protein molecule comprising a CXCR4 targeting polypeptide, and a nucleic acid binding moiety. The CXCR4 targeting polypeptide may be an antibody, such as scFv. In an embodiment, the nucleic acid binding moiety is a RNA binding moiety. The nucleic acid binding moiety may comprise a protamine, such as human protamine, or a viral antigen, or poly-arginine sequences, poly-histidine sequences, poly-lysine, TAT-derived sequences, cationic polymers, and cationic peptides. Linker peptides (such as comprising 1-30 amino acids) may be present between the sequences of the antibody and the RNA binding moiety. Other amino acids may be present N- or C-terminal to the sequences of the antibody and/or the RNA binding moiety.

This disclosure provides complexes (may be termed herein as nanoplexes) comprising a fusion protein molecule comprising a CXCR4 targeting polypeptide, and a nucleic acid binding moiety, and an inhibitory nucleic acid. The inhibitory nucleic acid may be short interfering nucleic acid (siNA), short interfering RNA (siRNA), double-stranded RNA (dsRNA), micro-RNA (miRNA), and short hairpin RNA (shRNA) and the like. In an embodiment the complex comprises a fusion protein molecule comprising anti-CXCR4 antibody and a RNA binding moiety (such as protamine), and an inhibitory nucleic acid (such as miRNA). The CXCR4 targeting polypeptides and/or inhibitory nucleic acids may promote macrophage polarization toward tumoricidal M1 phenotype (termed herein as M1 polarization), inhibit macrophage polarization toward immunosuppressive M2 phenotype (termed herein as M2 polarization) or both promote polarization toward M1 and inhibit polarization toward M2 phenotype. For example, siRNAs may be used to form complexes that promote M1 polarization and/or inhibit M2 polarization. A combination of inhibitory nucleic acids may be used some of which promote M1 polarization and some which inhibit M2 polarization. For example miRs may be used that promote M1 polarization or prevent M2 polarization. In an embodiment, a combination of miRs that promote M1 polarization, and miRs that inhibit M2 polarization may be used.

All nucleotide sequences described herein, their RNA and DNA equivalents, and complimentary sequences are included in this disclosure. All polynucleotide and amino acid sequences associated with GenBank accession numbers, miR databases (or other similar databases) described in this disclosure are incorporated herein by reference as those sequences are listed in the database as of the priority filing date of this application or patent.

Examples of suitable miRs (maybe referred to herein as miRNAs) that promote M1 polarization include miR-9 (Accession: MI0000466), miR-9-5p (Accession: MIMAT0000441), miR-155 (Accession: MI0000681), miR-155-5p (Accession: MIMAT0000646), miR-155-3p (Accession: MIMAT0004658), miR-125b (Accession: MI0000446), miR-127 (Accession: MI0000472), miR-127-5p (Accession: MIMAT0004604), miR-127-3p (Accession: MIMAT0000446), miR-26a/b (a=Accession: MI0000083; b=Accession: MI0000084), miR-147 (Accession: MI0005544), miR-147-3p (Accession: MIMAT0004928), miR-216a (Accession: MI0000292) and let-7f (Accession: MI0000067), miR-130a (Accession: MI0000448). Examples that may inhibit M2 polarization include miR-720 and miR-21 (Accession: MI0000077). The accession numbers cited for miRs are from the database miRBase.org. One or more of the miRs can be used. If more than one miRs are used, they may be used in any combination.

In an aspect, the present disclosure provides protein-RNA nanoplexes that combine four important features: (a) target specificity, (b) the ability to inhibit migration of macrophages and breast cancer cells, (c) the ability to polarize macrophages to tumoricidal M1-phenotypes, and (d) the ability for cellular delivery of miRNAs. Protein-based carriers, because of their structural flexibility are suitable for inhibitory small RNA delivery. The present novel CXCR4-scFv-RBM/miR-127 nanoplexes are unique in that they are designed to simultaneously target several key mechanisms contributing to cancer growth and spread: including cancer cell and inflammatory cell migration and tumor-promoting TAMs. To our knowledge, this is the first report to demonstrate that this carrier-free combinatorial approach can be successful in both macrophage polarization and halting cancer cell growth and migration. While previous approaches use CXCR4-targeting ligands to inhibit cellular migration alone, the present application of CXCR4-blocking ligands has not hitherto been explored for therapeutic gain.

In an embodiment, this disclosure provides single chain variable fragment (scFv) antibodies, RNA binding peptides, scFv-RNA binding peptide fusion proteins, vectors or cells comprising nucleic acids encoding scFvs and RNA binding peptides, all nucleotide sequences encoding the scFvs and RNA binding peptides described herein, compositions comprising any of the foregoing, methods of making any of the foregoing, and methods of using the scFvs and scFv-RNA binding fusion proteins or nucleic acid molecules in the treatment of conditions involving CXCR4/CXCL12 binding. This disclosure includes all amino acid sequences described herein and all contiguous segments thereof that are 3-25 amino acids in length, inclusive, and including all integers and ranges of integers therebetween. In embodiments, each CDR amino acid sequence of each antibody of this disclosure is included as a distinct sequence.

This disclosure provides compositions and methods for inhibiting cellular migration by blocking binding of CXCL12 to CXCR4. Monocytes and macrophages express CXCR4 and migrate in response to CXCL12 serving as a chemoattractant. In an example, the anti-CXCR4 scFvs described in this disclosure specifically block macrophage migration toward a CXCL12 chemotaxis gradient. In another example, the anti-CXCR4 scFvs described in this disclosure block cancer cell migration, such as breast cancer cell migration.

This disclosure provides methods and compositions for inhibiting macrophage polarization. In an example, the scFvs described in this disclosure that target the N-terminal domain of CXCR4 significantly promotes M1 macrophage polarization while inhibiting M2 macrophage polarization. This type of response is desirable in an anti-cancer setting as M1 macrophages suppress tumor growth whereas M2 macrophages promote tumor growth.

In an embodiment, this disclosure provides compositions and methods for both macrophage polarization and inhibiting cancer cell growth and migration. For example, the present compositions can be used for guiding macrophage polarization toward M1 phenotype and/or away from M2 phenotype, and inhibit tumor growth. Thus, the present compositions can be used for inhibition of tumor growth and metastasis. The nanocomplexes described in this disclosure can inhibit tumor growth and inhibit metastasis without the need for any other inhibitory agents. In an embodiment, the nanocomplexes are the only active agents used in the composition administered to an individual who is in need of treatment (such as an individual afflicted with cancer).

While specific sequences are listed in this disclosure, it will be appreciated that amino acid changes/substitutions may be made in the sequences without affecting the function/activity. Such, sequences which are 85%, 90%, 95%, 96%, 97%, 98% and 99% identical to the sequences disclosed herein or to the nucleotide sequences encoding the amino acid sequences disclosed herein are considered to be part of the disclosure.

In an embodiment the scFv antibodies of the present disclosure comprise the following sequences:

```
scFv sequences against the N-terminal domain of
CXCR4:
scFv#a:
                                    (SEQ ID NO: 1)
SYELTQPPSASGTPGQRVTISCSGSSSNIGSNYVYWYQQLPGTAPKLLIY

RNNQRPSGVPDRFSGSKSGTSASLAISGLRSEDEADYYCAAWDDSLNGVV

FGGGTKLTVLGEGKSSGSGSESKASQVTLKESGAEVKKPGASVKVSCKAS

GYTFTNFYIHWVRRAPGQGLEWMGIINPSDGRTTYAQKFQGRVTMTRDTS

TSTLYMELTSLRSEDTAVCGRGGHYSNYFGQPSTWGQGTLVTVSVEASHH

HHHH scFv#b:
                                    (SEQ ID NO: 2)
QSVLTQPPSASGTPGQRVTISCSGSSSNIGSNYVYWYQQLPGTAPKLLIY

RNNQRPSGVPDRFSGSKSGTSASLAISGLRSEDEADYYCAAWDDSLSGVI

FGGGTKLTVLGEGKSSGSGSESKASQVTLKESGAEVKKPGASVKVSCKAS

GYTFTNFYIHWVRRAPGQGLEWMGIINPSDGRTTYAQKFQGRVTMTRDTS

TSTLYMELTSLRSEDTAVYYCGRGGHYSNYFGQPSTWGQGTLVTVSVEAS

HHHHHH scFv#c:
                                    (SEQ ID NO: 3)
QSVLTQPPSASGTPGQRVTISCSGSSSNIGSNYVYWYQQLPGTAPKLLIY

RNNQRPSGVPDRFSGSKSGTSASLAISGLRSEDEGDYYCATWDDSLSGVV
```

-continued
```
FGGGTKLTVLGEGKSSGSGSESKASQVTLKESGAEVKKPGASVKVSCKAS

GYTFTNFYIHWVRRAPGQGLEWMGIINPSDGRTTYAQKFQGRVTMTRDTS

TSTLYMELTSLRSEDTAVYYCGRGGHYSNYFGQPSTWGQGTLVTVSVEAS

HHHHHH scFv#d:
                                              (SEQ ID NO: 4)
QSVLTQPPSASGTPGQGITISCSGSGSNIGSHTVSWYQQLPGTAPKLLIY

GNNNRPSGVPDRFSGSKSGTSATLGITGLQTGDDADYYCATWDTGPSAVV

FGGGTKLTVLGEGKSSGSGSESKASQVTLKESGAEVKKPGASVKVSCKAS

GYTFTNFYIHWVRRAPGQGLEWMGIINPSDGRTTYAQKFQGRVTMTRDAS

TSTLYMELTSLRSEDTAVYYCGKGGHYSNYFGQPSTWGQGTLVTVSVEAS

HHHHHH
```

In embodiments, the scFvs may have sequences that lack the poly histidine sequence (e.g. at the C-terminus), signaling sequences, cleavage sequences, targeting sequences, or other non-CDR sequences. This disclosure includes all the sequences without the hexahistidine sequence at the C-terminus.

An antibody of this disclosure can be a monoclonal antibody or a fragment or a derivative, such as an scFv, comprising a heavy chain variable region (VH) and a light chain variable region (VL) comprising complementarity-determining regions (CDRs) 1-3 and the CDRs having sequences set forth in FIG. 1. In FIG. 1 the sequences for the CDRs for the CXCR4 scFvs are the non-shaded regions underneath the appropriate heading label. For example, the sequence for $V_L$CDR1 in scFv # a is SGSSSNIGSNYVY (SEQ ID NO:5). In another example, the sequence for $V_H$CDR1 in scFv # b is NFYIH (SEQ ID NO:6).

An antibody in this disclosure can be a scFv directed to the N-terminal domain (NTD) of CXCR4 comprising a heavy chain variable region (VH) comprising 3 CDRs having sequences set forth in FIG. 1, and a light chain variable region comprising 3 CDRs having sequences set forth in FIG. 1.

In an embodiment, this disclosure provides an antibody, such as an scFv, referred to herein as scFv # a comprising a variable light chain (VL) and a variable heavy chain (VH), wherein the VL comprises CDRL1, denoted by the sequence SGSSSNIGSNYVY (SEQ ID NO:5), CDRL2, denoted by the sequence RNNQRPS (SEQ ID NO:20), and CDRL3, denoted by the sequence AAWDDSLNGVV (SEQ ID NO:21), and the VH comprises CDRH1, denoted by the sequence NFYII-1 (SEQ ID NO:6), CDRH2, denoted by the sequence IINPSDGRTTYAQ (SEQ ID NO:22), and CDRH3, denoted by the sequence GGHYSNYFGQPST (SEQ ID NO:23), wherein the antibody is specific for the N-terminal domain of CXCR4.

In an embodiment, the antibody, such as a scFv, comprises the sequence of SEQ ID NO:1, or a sequence of SEQ ID NO:1 which lacks the C-terminal polyhistidine sequence, or a sequence that is at least 80, 85, 90, 95, 98 or 99% identical to SEQ ID NO:1, or to a sequence of SEQ ID NO:1 without the polyhistidine sequence at the C-terminus, and is specific for the N-terminal domain of CXCR4.

In an embodiment, this disclosure provides an antibody, such as an scFv, referred to herein as scFv # b comprising a variable light chain (VL) and a variable heavy chain (VH), wherein the VL comprises CDRL1, denoted by the sequence SGSSSNIGSNYVY (SEQ ID NO:5), CDRL2, denoted by the sequence RNNQRPS (SEQ ID NO:20), and CDRL3, denoted by the sequence AAWDDSLSGVI (SEQ ID NO:24), and the VH comprises CDRH1, denoted by the sequence NFYII-1 (SEQ ID NO:6), CDRH2, denoted by the sequence IINPSDGRTTYAQ (SEQ ID NO:22), and CDRH3, denoted by the sequence GGHYSNYFGQPST (SEQ ID NO:23), wherein the antibody is specific for the N-terminal domain of CXCR4.

In an embodiment, the antibody, such as a scFv, comprises the sequence of SEQ ID NO:2, or a sequence of SEQ ID NO:2 which lacks the C-terminal polyhistidine sequence, or a sequence that is at least 80, 85, 90, 95, 98 or 99% identical to SEQ ID NO:2, or to a sequence of SEQ ID NO:2 without the polyhistidine sequence at the C-terminus, and is specific for the N-terminal domain of CXCR4.

In an embodiment, this disclosure provides an antibody, such as an scFv, referred to herein as scFv # c comprising a variable light chain (VL) and a variable heavy chain (VH), wherein the VL comprises CDRL1, denoted by the sequence SGSSSNIGSNYVY (SEQ ID NO:5), CDRL2, denoted by the sequence RNNQRPS (SEQ ID NO:20), and CDRL3, denoted by the sequence ATWDDSLSGVV (SEQ ID NO:25), and the VH comprises CDRH1, denoted by the sequence NFYIH (SEQ ID NO:6), CDRH2, denoted by the sequence IINPSDGRTTYAQ (SEQ ID NO:22), and CDRH3, denoted by the sequence GGHYSNYFGQPST (SEQ ID NO:23), wherein the antibody is specific for the N-terminal domain of CXCR4.

In an embodiment, the antibody, such as a scFv, comprises the sequence of SEQ ID NO:3, or a sequence of SEQ ID NO:3 which lacks the C-terminal polyhistidine sequence, or a sequence that is at least 80, 85, 90, 95, 98 or 99% identical to SEQ ID NO:3, or to a sequence of SEQ ID NO:3 without the polyhistidine sequence at the C-terminus, and is specific for the N-terminal domain of CXCR4.

In an embodiment, this disclosure provides an antibody, such as an scFv, referred to herein as scFv # d comprising a variable light chain (VL) and a variable heavy chain (VH), wherein the VL comprises CDRL1, denoted by the sequence SGSGSNIGSHTVS (SEQ ID NO:26), CDRL2, denoted by the sequence GNNNRPS (SEQ ID NO:27), and CDRL3, denoted by the sequence ATWDTGPSAVV (SEQ ID NO:28), and the VH comprises CDRH1, denoted by the sequence NFYIH (SEQ ID NO:6), CDRH2, denoted by the sequence IINPSDGRTTYAQ (SEQ ID NO:22), and CDRH3, denoted by the sequence GGHYSNYFGQPST (SEQ ID NO:23), wherein the antibody is specific for the N-terminal domain of CXCR4.

In an embodiment, the antibody, such as a scFv, comprises the sequence of SEQ ID NO:4, or a sequence of SEQ ID NO:4 which lacks the C-terminal polyhistidine sequence, or a sequence that is at least 80, 85, 90, 95, 98 or 99% identical to SEQ ID NO:4, or to a sequence of SEQ ID NO:4 without the polyhistidine sequence at the C-terminus, and is specific for the N-terminal domain of CXCR4.

The term "antibody" as used herein can encompass whole antibody molecules, full-length immunoglobulin molecules, such as naturally occurring full-length immunoglobulin molecules or full-length immunoglobulin molecules formed by immunoglobulin gene fragment recombinatorial processes, as well as antibody fragments including scFvs. Antibody fragments can be fragments comprising at least one antibody-antigen binding site. Antibody fragments can, for example, exhibit specific binding to CXCR4 or fragments thereof. The term "antibody" can include e.g. monoclonal, polyclonal, multispecific (for example bispecific), recombinant, human, chimeric and humanized antibodies.

The term "antibody" can also encompass recombinantly expressed antigen binding proteins and antigen binding synthetic peptides. Further, the term "antibody" can encompass minibodies, and diabodies, all of which preferably exhibit specific binding to CXCR4 or a fragment thereof, especially human CXCR4. The term "antibody", as used herein, can also encompass antibodies produced in vivo, as well as those produced in vitro, such as, for example, by a bacterial expression system or a mammalian hybridoma cell line.

An antibody of the present disclosure may be modified by, for example, acetylation, formylation, amidation, phosphorylation, or polyethylene glycolation (PEGylation), as well as glycosylation. The term "antibody" as used herein is intended to cover all antibodies disclosed herein. For example, the term "antibody" can refer to monoclonal, polyclonal, scFv, chimeric, human, or humanized antibodies, or antigen (i.e., CXCR4) binding fragments thereof.

In an embodiment, anti-CXCR4 scFvs are PEGylated to increase half-life and bioavailability. Various types of PEG molecules can be added to the scFvs, including but not limited to PEG(5K), PEG(10K), PEG(20K), and PEG(40K). The scFvs can be modified by the addition of a cysteine, lysine or serine amino acid to facilitate PEGylation. This modification can occur at, but is not limited to, the C-terminus of the scFv.

In an embodiment, this disclosure provides isolated antibodies. By the term "isolated" it is meant that the antibody or the fragment thereof, is separated and/or recovered from its natural environment. The isolation of the antibody from its natural environment can be such that the antibody can be used without interference from other active agents (such as other proteins) that normally are present in its natural environment.

"Fv" is the minimum antibody fragment that contains a complete antigen-recognition and binding site and single-chain Fv also abbreviated as "sFv" or "scFv" are antibody fragments that comprise the VH and VL antibody domains connected into a single polypeptide chain, and may comprise linkers. The term "diabodies" refers to small antibody fragments prepared by constructing sFv fragments with short linkers between the VH and VL domains such that inter-chain but not intra-chain pairing of the V domains is achieved, resulting in a bivalent fragment, i.e., fragment having two antigen-binding sites. A single domain antibody (sdAb) is an antibody fragment which has a single monomeric variable antibody domain. ScAbs can be made from heavy-chain antibodies found in camelids. An antibody fragment can be a single variable region or a peptide consisting of or comprising a single CDR. A single-chain antibody has a heavy chain variable domain and a light chain variable domain linearly linked to each other via a linker. A polynucleotide (such as DNA) encoding the single-chain antibody can be produced by binding a polynucleotide encoding the heavy chain variable domain, a polynucleotide encoding the linker (typically 10-20 nucleotides), and a polynucleotide encoding the light chain variable domain, with the heavy chain variable domain and the light chain variable domain being both derived from a human antibody.

As an example, this disclosure provides scFv antibodies, which can be isolated scFv antibodies, which specifically bind to CXCR4, which can be human CXCR4. As an example, scFvs designated scFv # a, scFv # b, scFv # c, and scFv # d are provided. These scFvs bind to the N-terminal domain of CXCR4.

In an embodiment, the anti-CXCR4 scFvs can be linked to RNA binding peptides, which may then bind inhibitory RNAs, such as miRNAs. Any RNA binding peptide (maybe herein referred to as RNA binding motif peptide) may be used. As an example, the anti-CXCR4 scFvs of the present disclosure can be linked to a protamine RNA-binding motif (RBM) peptide to create a CXCR4-scFv-RBM fusion protein, herein referred to as CXCR4-scFv-RBM which is capable of binding and complexing small RNAs, such as miRNAs, into self-assembling nanoplexes. An example of a sequence for protamine RBM peptide is RSQSRSRYYRQRQRSRRRRRRS (SEQ ID NO:7). In an example, the fusion protein can be comprised of the anti-CXCR4 scFv # c and the protamine RBM peptide with the following sequence:

```
(SEQ ID NO: 8)
MLQSVLTQPPSASGTPGQRVTISCSGSSSNIGSNYVYWYQQLPGTAPKLL

IYRNNQRPSGVPDRFSGSKSGTSASLAISGLRSEDEGDYYCATWDDSLSG

VVFGGGTKLTVLGEGKSSGSGSESKASQVTLKESGAEVKKPGASVKVSCK

ASGYTFTNFYIHWVRRAPGQGLEWMGIINPSDGRTTYAQKFQGRVTMTRD

TSTSTLYMELTSLRSEDTAVYYCGRGGHYSNYFGQPSTWGQGTLVTVSSV

DGGGGSGGGSRSQSRSRYYRQRQRSRRRRRRSENLYFQGLEHHHHHH.
```

The fusion protein of SEQ ID NO:8 may be present without the polyhistidine tag at the C-terminus.

In an embodiment, the fusion protein comprises scFv # a, scFv # b, scFv # c or scFv # d and the protamine RBM peptide of SEQ ID NO:7, wherein the scFv may be N- or C-terminal to the RBM peptide and there may be linker amino acids between the scFv and the RBM peptide and linker amino acids at the N- or C-terminus of the fusion protein. There may also be polyhistidine or other tags for purification or protection purposes at the N- or C-terminus. However, this disclosure also discloses and covers all fusion proteins without the polyhistidine and other purification tags.

In an embodiment, the disclosure provides a fusion protein comprising an antibody comprising variable light chain (VL) comprising CDRL1 denoted by the sequence SGSSSNIGSNYVY (SEQ ID NO:5), CDRL2, denoted by the sequence RNNQRPS (SEQ ID NO:20), and CDRL3, denoted by the sequence AAWDDSLNGVV (SEQ ID NO:21), and a variable heavy chain (VH) comprising CDRH1, denoted by the sequence NFYIH (SEQ ID NO:6), CDRH2, denoted by the sequence IINPSDGRTTYAQ (SEQ ID NO:22), and CDRH3, denoted by the sequence GGHYSNYFGQPST (SEQ ID NO:23), and RNA binding peptide, such as protamine. In an embodiment, the fusion protein is complexed to an inhibitory RNA, such as siRNA or miRNA (e.g., miR-127), which promotes M1 polarization and/or inhibits M2 polarization of macrophages.

In an embodiment, the disclosure provides a fusion protein comprising an antibody comprising variable light chain (VL) comprising CDRL1, denoted by the sequence SGSSSNIGSNYVY (SEQ ID NO:5), CDRL2, denoted by the sequence RNNQRPS (SEQ ID NO:20), and CDRL3, denoted by the sequence AAWDDSLSGVI (SEQ ID NO:24), and a variable heavy chain (VH) comprising CDRH1, denoted by the sequence NFYIH (SEQ ID NO:6), CDRH2, denoted by the sequence IINPSDGRTTYAQ (SEQ ID NO:22), and CDRH3, denoted by the sequence GGHYSNYFGQPST (SEQ ID NO:23), and RNA binding peptide, such as protamine. In an embodiment, the fusion protein is complexed to an inhibitory RNA, such as siRNA or miRNA (e.g., miR-127), which promotes M1 polarization and/or inhibits M2 polarization of macrophages.

In an embodiment, the disclosure provides a fusion protein comprising an antibody comprising variable light chain (VL) comprising CDRL1, denoted by the sequence SGSSSNIGSNYVY (SEQ ID NO:5), CDRL2, denoted by the sequence RNNQRPS (SEQ ID NO:20), and CDRL3, denoted by the sequence ATWDDSLSGVV (SEQ ID NO:25), and a variable heavy chain (VH) comprising CDRH1, denoted by the sequence NFYIH (SEQ ID NO:6), CDRH2, denoted by the sequence IINPSDGRTTYAQ (SEQ ID NO:22), and CDRH3, denoted by the sequence GGHYSNYFGQPST (SEQ ID NO:23), and RNA binding peptide, such as protamine. In an embodiment, the fusion protein is complexed to an inhibitory RNA, such as siRNA or miRNA (e.g., miR-127), which promotes M1 polarization and/or inhibits M2 polarization of macrophages.

In an embodiment, the disclosure provides a fusion protein comprising an antibody comprising variable light chain (VL) comprising CDRL1, denoted by the sequence SGSGSNIGSHTVS (SEQ ID NO:26), CDRL2, denoted by the sequence GNNNRPS (SEQ ID NO:27), and CDRL3, denoted by the sequence ATWDTGPSAVV (SEQ ID NO:28), and a variable heavy chain (VH) comprising CDRH1, denoted by the sequence NFYIH (SEQ ID NO:6), CDRH2, denoted by the sequence IINPSDGRTTYAQ (SEQ ID NO:22), and CDRH3, denoted by the sequence GGHYSNYFGQPST (SEQ ID NO:23), and RNA binding peptide, such as protamine. In an embodiment, the fusion protein is complexed to an inhibitory RNA, such as siRNA or miRNA (e.g., miR-127), which promotes M1 polarization and/or inhibits M2 polarization of macrophages.

A fusion protein comprises all or a biologically active part of a first peptide or polypeptide operably linked to all or a biologically active part of a second peptide or polypeptide. The term "operably linked" means that first polypeptide and the second polypeptide are produced in the same reading frame. The fusion protein can be produced using standard molecular biology techniques, when given the benefit of the present disclosure. In embodiments, the fusion protein is produced by expression from an expression vector that encodes the first and second polypeptides, wherein the first and second polypeptides are encoded in the same open reading frame. Such expression vectors are encompassed by the disclosure, and a wide variety of systems for expressing and separating fusion polypeptides are commercially available and can be adapted for producing fusion proteins of the present disclosure. In embodiments, the first and second peptides or polypeptides may be contiguous without intervening amino acids, or amino acids may be between the first and second polypeptide sequences. Additional amino acids may be present at the N or C terminus of the fusion protein.

The RBM motif peptide may be to the N- or C-terminal ends of the scFv sequence and there may be intervening amino acids, between the sequences of the two (scFv and RBM motif), and/or to the N- or C-terminal ends of one or both.

In an embodiment, in addition to the protamine RNA binding motif, or alternatively, other RNA binding motifs can be linked to the anti-CXCR4-scfvs (meaning scFvs directed to CXCR4) described in this disclosure. Examples include arginine-rich sequences Rn (n=number of arginines), histidine-rich sequences Hn, lysine-rich sequences Kn (n=number of lysines), where n may be from 3 to 20 amino acids, or where the specific amino acid may make up 20 to 90% of the region, TAT-derived sequences (GRKKRRQRRRPQ) (SEQ ID NO:29), cationic polymers, cationic peptides.

In an embodiment, the [anti-CXCR4-scFv]-RBM fusion protein can be complexed to small polynucleotide RNAs, such as miRNAs or shRNAs, for delivery to tumor cells and other cells within the tumor microenvironment. In an embodiment, the miRNA bound to the [anti-CXCR4-scFv]-RBM fusion proteins can be miRNA-127 (miR-127) to target macrophage polarization to the M1 phenotype. Other miRNAs may be additionally or alternatively used to guide macrophage polarization to the M1 phenotype or away from the M2 phenotype. In examples, the disclosure provides complexes of [anti-CXCR4]-RBM fusion protein with miRs selected from the group consisting of miR-9, miR-9-5p, miR-155, miR-155-5p, miR-155-3p, miR-125b, miR-127, miR-127-5p, miR-127-3p, miR-26a/b, miR-147, miR-147-3p, miR-216a, mR-let-7f, miR-130a, miR-720 and miR-21. In additional examples, other miRNAs of choice can be bound to the [anti-CXCR4-scFv]-RBM fusion protein to target additional pathways.

The present disclosure also provides isolated nucleotide sequences encoding all or portions of the amino acid sequences disclosed herein. For example, the present disclosure provides an isolated nucleic acid molecule comprising the sequences that encode the CDRs, such as CDRL1, CDRL2, CDRL3, CDRH1, CDRH2, CDRH3 for the various scFvs disclosed herein, such as scFv # a, b, c and d. In an embodiment, the present disclosure also provides isolated nucleic acid molecules comprising or consisting of the sequence encoding one or more CDRs that recognize a NTD or another domain of CXCR4. In an embodiment, the present disclosure provides nucleic acid molecules comprising or consisting of sequences encoding the fusion proteins as disclosed herein, such as fusion proteins comprising anti-CXCR4-scFv and RNA binding peptide. The disclosure also provides cells comprising an expression vector or other polynucleotide sequence encoding the antibodies, CDRs, and fusion proteins provided herein (including scFvs). Nucleotide sequences encoding the scFvs and fusion proteins can be expressed using any suitable expression vector, many of which are known in the art and/or are commercially available. A vector generally includes nucleic acid sequences, such as origin or replication that enables it to replicate in a host cell. A vector can also include selectable marker genes.

In an embodiment, this disclosure provides compositions comprising anti-CXCR4 scFvs, or [anti-CXCR4-scFvs]-RBM, optionally complexed with small inhibitory RNA (e.g., miR127), loaded onto liposomes. Standard approaches for ligand attachment to aqueous liposome nanoparticles make use of maleimides, succinimidyl esters and carbodiimide-activated carboxylic acids. These can covalently react with amine and thiol groups of polypeptides. The use of maleimide-lipids has been explored extensively for antibody-conjugated liposomes. Conjugation yields may reach as high as 90% from an overnight reaction, but subsequent quenching of free maleimide groups and additional purification is required. Proteins may require a preparative step of thiolation and purification prior to conjugation. Antibody orientation is a major factor influencing the conjugated antibody target binding efficacy, but these approaches result in numerous antibody labeling sites and indiscriminate orientations. Biorthogonal synthetic strategies such as the click reaction have recently been applied to pre-formed liposomes, however these require the use exogenous catalysts and unconventional amino acids.

The liposomes in the present disclosure may be spherical or non-spherical. The size of the liposomes can be from 50 to 1000 nm or more. In one embodiment, the liposomes have a size (e.g., a longest dimension such as, for example, a diameter) of 50 to 1000 nm, including all integer nm values and ranges therebetween. For example, the size may be from 50 to 200 nm or from 20 to 1000 nm. If the liposomes are not spherical, the longest dimension can be from 50 to 1000 nm. These dimensions can be achieved while preserving the nanostructure width of the monolayer or the bilayer. The liposomes can carry cargo in the aqueous compartment. The cargo, or part thereof, can also, or alternatively, be incorporated in the monolayer or the bilayer.

In an embodiment, this disclosure provides liposomes comprising: a monolayer or a bilayer, wherein the monolayer or bilayer comprises anti-CXCR4 scFv lipid conjugates, optionally phospholipids that are not conjugated to anti-CXCR4 scFvs, and a polyhistidine-tagged presentation molecule, wherein the polyhistidine tag is linked to the scFv in the hydrophobic portion of the monolayer or the bilayer and one or more histidines of the polyhistidine tag are coordinated to nickel atoms attached to the lipids in the lipid monolayer or bilayer of the liposomes. In an embodiment, anti-CXCR4 scFvs are His-tagged and loaded on to liposomes containing lipids in the monolayer or bilayer that are bound with nickel. Additionally, scFvs can be conjugated to maleimide lipids for further downstream applications.

In an embodiment, this disclosure provides liposomes comprising: a monolayer or a bilayer, wherein the monolayer or bilayer comprises fusion proteins such as [anti-CXCR4 scFv]-RBM, optionally complexed with inhibitory small RNA (e.g., miRNA, such as miR127) lipid conjugates, optionally phospholipids that are not conjugated to the fusion proteins, and a polyhistidine-tagged presentation molecule, wherein the polyhistidine tag is linked to the scFv or the RBM (or a linker portion of the fusion molecule) in the hydrophobic portion of the monolayer or the bilayer and one or more histidines of the polyhistidine tag are coordinated to nickel atoms attached to the lipids in the lipid monolayer or bilayer of the liposomes. In an embodiment, fusion molecules are His-tagged and loaded on to liposomes containing lipids in the monolayer or bilayer that are bound with nickel. Additionally, the fusion molecules can be conjugated to maleimide lipids for further downstream applications.

Reactivity of antibodies toward specific antigens, such as CXCR4, can be measured by routine methods such as, for example, ELISA. Reactivity is an indication of the binding affinity. Binding affinity can also be measured by antigen/antibody dissociation rates or competition radioimmunoassays and the like. Specific binding of an antibody to an antigen means it binds the antigen with high affinity and does not specifically bind to unrelated antigens.

The present disclosure also provides a pharmaceutical composition comprising a pharmaceutically acceptable carrier and one or more scFvs, scFv-RBM fusion proteins and/or [anti-CXCR4-scFv]-RBM-miRNA-127 of the present disclosure. Examples of carriers include solutions, suspensions, emulsions, solid injectable compositions that are dissolved or suspended in a solvent before use, and the like. The injections may be prepared by dissolving, suspending or emulsifying one or more of the active ingredients in a diluent. Examples of diluents, include, but are not limited to distilled water for injection, physiological saline, vegetable oil, alcohol, dimethyl sulfoxide, and a combination thereof. Further, the injections may contain stabilizers, solubilizers, suspending agents, emulsifiers, soothing agents, buffers, preservatives, etc. The injections may be sterilized in the final formulation step or prepared by sterile procedure. The composition of the disclosure may also be formulated into a sterile solid preparation, for example, by freeze-drying, and can be used after sterilized or dissolved in sterile injectable water or other sterile diluent(s) immediately before use. Additional examples of pharmaceutically include, but are not limited to, sugars, such as lactose, glucose, and sucrose; starches, such as corn starch and potato starch; cellulose, including sodium carboxymethyl cellulose, ethyl cellulose, and cellulose acetate; powdered tragacanth; malt; gelatin; talc; excipients, such as cocoa butter and suppository waxes; oils, such as peanut oil, cottonseed oil, safflower oil, sesame oil, olive oil, corn oil, and soybean oil; glycols, such as propylene glycol; polyols, such as glycerin, sorbitol, mannitol, and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; phosphate buffer solutions; and other non-toxic compatible substances employed in pharmaceutical formulations. Additional non-limiting examples of pharmaceutically acceptable carriers can be found in: Remington: *The Science and Practice of Pharmacy* (2005) 21st Edition, Philadelphia, PA. Lippincott Williams & Wilkins.

The scFvs, [anti-CXCR4-scFv]-RBM fusion proteins and/or [anti-CXCR4-scFv]-RBM-miRNA-127 of the present disclosure, or a composition comprising one or more scFvs, CXCR40-scFv-RBM fusion proteins and/or CXCR4-scFv-RBM-miRNA-127 may be used to block CXCL12 from binding CXCR4. The activity may be altered in vitro or in vivo. As such, the present compositions may be administered to an individual who is exhibiting or expected to exhibit abnormal CXCR4/CXCL12 binding. Examples of conditions in which the present scFvs, CXCR4-scFv-RBM fusion proteins and/or CXCR4-scFv-RBM-miRNA-127 and compositions can be used is any condition in which CXCR4/CXCL12 binding is abnormal. Such conditions can include, but are not limited to, cancer and immune disorders.

In an embodiment, the disclosure provides a method for treatment of an individual diagnosed with or suspected or having cancer, and/or diagnosed with or suspected of having a metastasized cancer, comprising administering to the individual nanoplexes or compositions comprising the nanoplexes comprising [anti-CXCR4]-RBM complexed to inhibitory small RNA. In an embodiment, the disclosure provides a method for treatment of an individual diagnosed with or suspected or having cancer, and/or diagnosed with or suspected of having a metastasized cancer, comprising administering to the individual nanoplexes or compositions comprising the nanoplexes comprising [anti-CXCR4 scFv]-RBM complexed to miRNA, such as miR-127.

In an aspect, the disclosure provides methods for treating an individual having or suspected of having cancer whose tumor sample has CXCR4 expressing cells and/or CXCL12 secreting cells. A sample from the individual's tumor (e.g., biopsy and/or blood sample) may be used to measure CXCR4 and/or CXCL12 levels. If the tumor is found to have elevated CXCR4 and/or CXCL12 levels, a suitable amount of the anti-CXCR4 scFv, CXCR4-scFv-RBM fusion protein and/or CXCR4-scFv-RBM-miRNA-127 therapy can be administered to the individual using a suitable route (e.g., intratumoral, intravenous, intradermal injection). The treatment may be carried out without first sampling CXCR4 and/or CXCL12 levels. In an embodiment, the individual may be administered one or more anti-CXCR4 scFvs or a composition comprising one or more anti-CXCR4 scFvs comprising or consisting of the sequences of SEQ ID NO:1-4. In an embodiment, the individual may be administered one or more [anti-CXCR4 scFvs]-RBM-miRNA-127 or a composition comprising one or more [anti-CXCR4 scFvs]-RBM-miRNA-127 comprising or consisting of [anti-CXCR4 scFvs]-RBM-miRNA-127.

The disclosure provides a method for treating tumors, such as tumors that comprise CXCR4-expressing cells, for example tumor-associated macrophages (TAMs). Such tumors may be referred to herein as "CXCR4-expressing tumors". The term "treatment" refers to reduction in one or more symptoms or features associated with the presence of the particular condition being treated. Treatment does not necessarily mean complete remission, nor does it preclude recurrence or relapses. For example, the present disclosure provides a method for reducing the size of a tumor or arresting the growth of a tumor or reducing the rate of growth of a tumor (such as a tumor comprising CXCR4-expressing cells and/or CXCL12 secreting cells) or reducing any other symptom that is associated with an individual being afflicted with the tumor—all of which are considered as "treatment"—comprising administering to an individual in need of treatment, a therapeutically effective amount of a composition comprising antibodies, fragments thereof, and/or antibodies or fragments fused with an RNA binding protein containing an RNA molecule, as described herein. In an embodiment, the method of treatment is a method of passive immunization Examples of tumors that can be treated by the present anti-CXCR4 scFvs, anti-CXCR4-scFv-RBM fusion protein and/or anti-CXCR4-scFv-RBM-miRNA-127 or compositions comprising anti-CXCR4 scFvs, anti-CXCR4-scFv-RBM fusion protein and/or anti-CXCR4-scFv-RBM-miRNA-127 include, but are not limited to, breast adenocarcinoma, glioma, glioblastoma, medulloblastoma, multiple myeloma, melanoma, meningioma, ovarian carcinoma, prostate carcinoma, leukemia, lymphoma, colon carcinoma, pancreatic cancer, hepatic cancer, kidney cancer, sarcoma and the like.

In an embodiment, the disclosure provides a method of passive immunization comprising administering to an individual in need of treatment, a therapeutically effective amount of one or more of the anti-CXCR4 scFvs, [anti-CXCR4-scFv]-RBM fusion protein and/or [anti-CXCR4-scFv]-RBM-miRNA-127 or a composition comprising one or more of the anti-CXCR4 scFvs, [anti-CXCR4-scFv]-RBM fusion protein and/or [anti-CXCR4-scFv]-RBM-miRNA-127 and which antibodies have been isolated from the subject (human or non-human) they were raised in or obtained from a hybridoma supernatant, bacterial expression system, or may be engineered antibodies using sequences from the isolated antibodies.

In an embodiment, the disclosure provides a method for promoting M1 macrophage phenotype and/or inhibiting M1 macrophage phenotype comprising administering to an individual in need of treatment a composition comprising a CXCR4 antibody (including a derivative or fragment thereof), optionally fused to a RNA binding peptide, further optionally the fused molecule being complexed to inhibitory RNA, wherein the inhibitory RNA also promotes M1 macrophage phenotype and/or inhibits M1 macrophage phenotype.

In an embodiment, this disclosure provides a method of treating an individual afflicted with or suspected of being afflicted with cancer, including metastatic cancer comprising: a) obtaining a sample from the individual, wherein the sample comprises tumor cells; b) determining the levels of M2 macrophages and/or CXCR4 present in that sample and comparing that level to a reference standard whereby if the individuals M2 macrophage and/or CXCR4 levels in the obtained sample is greater than the reference standard then; c) administering to the individual a composition comprising [anti-CXCR4-scFv]-RBM fusion protein complexed to inhibitory small RNA (such as miRNA, such as miR-127), and optionally, d) monitoring the M2 macrophage and/or CXCR4 levels in the individual following treatment.

The following examples are meant to illustrate, and are not intended to be limiting.

EXAMPLE

This example describes that CXCR4 inhibition modulates macrophage polarization.

Materials and Methods

2xYT medium with carbenicillin was obtained from Thermo Fisher Scientific (Waltham, MA). The peptide corresponding to the N-terminal domain of CXCR4 (MEPISIYT SDNYSEEVGSG-DYD SNKEPCFRDENVHFNRIFLPTIYF (SEQ ID NO:9)) was synthesized by ABclonal (Woburn, MA). Restriction enzymes were obtained from New England Biolabs (Ipswich, MA). CXCL12 recombinant protein was purchased from Thermo Fisher Scientific.

Phage Library Screening Against the N-Terminal Domain of CXCR4

The biotinylated CXCR4 N-terminal domain was captured on magnetic streptavidin-coated beads, and three rounds of affinity selection were performed as previously described (Deci et al., Mol. Pharm. 15:2721-2731, 2018). Selection was performed using a phage display library constructed from peripheral human blood lymphocytes that express single-chain antibody fragments. To identify CXCR4 N-terminal domain binders, single bacterial colonies were picked after the third round of selection for phage amplification followed by a phage enzyme-linked immunosorbent assay (ELISA). Clones that yielded a signal above background were sequenced and further analyzed with regard to binding affinity.

Phage ELISA 200 individual colonies were picked and cultured in a 96-well plate with 2xYT medium. Phages were produced using helper phages. Phage particles in the supernatant were added to a 96-well plate that was first coated with neutravidin and then coated with the biotinylated CXCR4 N-terminal domain for 1 h at room temperature (RT). Unbound phages were removed by five washes with 0.1% PBST (PBS with 0.1% Tween). Anti-M13-HRP antibody was added and incubated for 1 h at RT, followed by five washes with 0.1% PBST. Ultra-TMB substrate (Thermo Fisher Scientific) was added followed by incubation for 15 min. The plate was analyzed at a wavelength of 405 nm.

Expression of Anti-CXCR4 scFv Expression and CXCR4-scFv Protamine Fusion Protein The CXCR4-scFv cloned into the pET21a vector (Novagen, Burlington, MA) was expressed in BL-21 (DE3) cells (Lucigen, Middleton, WI) as previously described. Briefly, a 1 L 2xYT culture was inoculated with 1% of an overnight culture and grown to an $OD_{600}$ of ~0.6. Protein expression was induced with 0.2 mM isopropyl β-D-1-thiogalactopyranoside (IPTG) and bacterial cells grown at 24° C. overnight before pelleting the cells by centrifugation. The cell pellet was re-suspended in lysis buffer containing 50 mM Tris, 100 mM KCl, and 2 M urea at pH 8.5. The cell suspension was centrifuged at 9000×g for 5 min at 4° C., and the pellet was collected. After several washes, the pellet was resuspended in solubilization buffer (50 mM Tris, 100 mM KCl, 5 M guanidine, and 10 mM (3-mercaptoethanol, pH 8.5). The solution was incubated at 37° C. for 1 h and then centrifuged at 9000×g for 10 min at 4° C. The supernatant was then diluted into refolding buffer (50 mM Tris, 500 mM NaCl, 400 mM sucrose, 3 mM reduced glutathione, 0.3 mM oxidized glutathione, 0.5% Triton X-100, 10% glycerol, and 10 mM imidazole at pH 8.5). The solution was stirred at 200 rpm at 4° C. for 48 h and then purified with TALON cobalt beads (Clontech, Mountain View, CA). To create a CXCR4-scFv protamine fusion protein, we designed a gblock (IDT) encoding the CXCR4-scFv and protamine (RSQSRSRYYRQRQRSRRRRRRS (SEQ ID NO:7)). The PCR-amplified product containing XhoI and BamHI restriction sites was cloned into the pET21a vector. Protein expression was done as described for the CXCR4-scFv.

ELISA-Based scFv Binding Affinity Assay

The binding affinity of the anti-CXCR4 scFv was assessed with an ELISA. Purified anti-CXCR4 scFvs were serially diluted and added to a 96-well plate that was first coated with neutravidin and then coated with the biotinylated CXCR4 N-terminal peptide domain. Anti-FLAG-HRP conjugate (Sigma Aldrich) served as the primary antibody. 100 µL of Ultra-TMB substrate (Thermo Fisher Scientific) was added to quantify the amount of bound anti-CXCR4 scFv. The reaction was then quenched with 12.5 M $H_2SO_4$ aqueous solution. Readings were taken using a plate reader with the wavelength set to 450 nm.

Cell Binding Assay

RAW 264.7 macrophages, MDA-MB-231 breast cancer cells, and HEK-293 cells were purchased from the ATCC. Cell lines were cultured in DMEM supplemented with L-glutamine and 10% FBS. For the cell binding assay, the anti-CXCR4 scFv was fluorescently labeled with Dylight 650. Dylight 650-NHS ester was added in 5 molar excess to the anti-CXCR4 scFv in PBS pH 7.4 and incubated at 4° C. overnight. The Dylight-labeled CXCR4-scFv was purified from unincorporated dye using a spin filter (10 kDa cutoff, Thermo Fisher Scientific). Cells were blocked with 200 µL PBS containing 5% BSA at 4° C. for 1 h. After blocking, anti-CXCR4 fluorescently labeled with Dylight 650 (Thermo Fisher Scientific) was added at increasing concentrations, and cells were incubated at 4° C. for 1 h. The cells were then washed three times with PBS containing 5% BSA. To detach the cells, 500 µL PBS with 1 mM EDTA pH 7.4 was added to each well. The amount of Dylight 650-labeled CXCR4-scFv was analyzed using the MACSQuant Analyzer 10 (Miltenyi Biotec, Bergisch Gladbach, Germany). 10,000 cells were counted.

To confirm the binding of CXCR4-scFv to CXCR4-positive cells, we performed fluorescence imaging. RAW 264.7 macrophages, MDA-MB-231 breast cancer cells, and HEK-293 cells were incubated with Dylight 650-labeled CXCR4-scFv at 4° C. for 1 h. Cells were washed 5 times with PBS and nuclei were stained with DAPI for 5 min at RT. Cells were embedded in FlUOROSAVE™. The images were captured using a Zeiss Axio Observer at 20× magnification.

Cell Migration Assay

A QCM chemotaxis cell migration assay with an 8 µm membrane pore size (EMD Millipore, Burlington, MA) was used to assess the effects of the anti-CXCR4 scFv on the cellular migration of RAW 264.7 and MDA-MB-231 cells. Cells were serum starved for 24 h and then incubated with anti-CXCR4 scFv for 30 min at 4° C. in migration buffer before being transferred to the transwell kit. The optimal concentration of CXCL12 for inducing cell migration inhibition was determined by incubating MDA-MB-231 cells with increasing concentrations of CXCL12 (0, 6.5, 12.5, 50, 100, and 200 nM). After 4 h (RAW 264.7) or 22 h (MDA-MB-231) of incubation, the cells were detached from the bottom of the membrane and analyzed using fluorimetric measurements according to the instructions provided.

Isolation of Bone Marrow-Derived Macrophages (BMDM)

BMDMs were isolated from femurs of CD-1 mice. All methods and experiments were performed in accordance with the U.S. National Institute of Health Guide for Care and Use of Laboratory Animals. Experiments were approved by the Institutional Animal Care and Use Committee of the University at Buffalo. Briefly, a 25 G needle with 5 mL ice cold sterile PBS was inserted into the bone marrow cavity of the femur to flush out the cells. The bone was flushed until the cavity appeared white. Cells were collected by centrifugation and cultured in macrophage complete medium with 100 IU/mL macrophage colony-stimulating factor (M-CSF). On day 3, an additional 5 mL of macrophage complete medium with 100 IU/mL M-CSF was added. Cells were used on day 7.

Macrophage Polarization

BMDMs were incubated with IL-4 (20 ng/mL; Pepro-Tech, Rocky Hill, NJ) for 24 h and washed with PBS followed by addition of anti-CXCR4 scFv for 24 h. Total RNA was isolated with QIAzol lysis reagent (Qiagen, Venlo, Netherlands), and total cDNA was generated using the New England Biolabs (Ipswich, MA) first stand synthesis kit. RNA expression was detected by reverse transcription (RT)-PCR performed with the SYBR Green PCR kit (Qiagen). For each sample, the ΔΔCt value was calculated. Experiments were performed in triplicate. The primers were: β-actin (forward: 5'-ccctgtatgcctctggtc-3' (SEQ ID NO:10), reverse: 5'-gtctttacggatgtcaacg-3' (SEQ ID NO:11)), iNOS (forward: 5'-tttgcttccatgctaatgcgaaag-3' (SEQ ID NO:12), reverse: 5'-gctctgttgaggtctaaaggctccg-3' (SEQ ID NO:13)), IL-6 (forward: 5'-tgggaaatcgtggaaatgag-3' (SEQ ID NO:14), reverse: 5'-ctgaaggactctggctttgtc-3' (SEQ ID NO:15)), ARG-1 (forward: 5'-cagaagaatggaagagtcag-3' (SEQ ID NO:16), reverse: 5'-cagatatgcagggagtcacc-3' (SEQ ID NO:17)), and MGL2 (forward: 5'-aaaaccaggagatgagaaatgg-3' (SEQ ID NO:18), reverse: 5'-cggagatgaccaccagtagc-3' (SEQ ID NO:19)).

BMDM Immunofluorescence

BMDMs were seeded into 24-well plates containing poly-L-lysine coated coverslips and incubated overnight at 37° C.

Culture medium was replaced with fresh medium with or without 100 ng/ml LPS, 20 ng/ml IL-4, CXCR4-scFv-RBM/miR-127 nanoplexes. After 24 h, samples were washed with PBS and fixed in 4% paraformaldehyde. Samples were then permeabilized with 0.25% Triton X-100 in PBS and blocked with 1% BSA PBS-T for 1 h. Primary antibodies diluted 1:100 in 1% BSA were applied to the samples at RT for 1 h and washed. Samples were then incubated with secondary antibodies diluted 1:200 in 1% BSA at RT for 1 h. Cells were counterstained with DAPI and mounted with FluorSave mounting media (Merck Millipore, Burlington, MA). The following antibodies were used: iNOS (M1 marker; Abcam, Cambridge, UK; Cat #: Ab15323) and CD206 (M2 marker; R&D Systems, Minneapolis, MN; Cat #: AF2535). Secondary antibodies were: AF568 (Invitrogen, Cat # A10042) and AF488 (Invitrogen, Cat # A11055).

Cell Viability Assay

To assess the cytotoxicity of CXCR4-scFv-RBM and CXCR4-scFv-RBM/miR-127 nanoplexes, RAW 264.7 macrophages were treated for 48 h with increasing concentrations of CXCR4-scFv-RBM and CXCR4-scFv-RBM/miR-127. After 48 h, 20 uL of MTS substrate (Biovision, CA) was added to the wells and incubated for an additional 2 h at 37° C. The formazan dye produced by the viable cells was measured using a SpectraMax i3 plate reader at 490 nm.

RNA Complexation Assay

RNA complexation was assayed as previously described using a Ribogreen (Thermo Fisher) exclusion assay. Briefly, 0.2 μg of miRNA was complexed with increasing amounts of CXCR4-scFv-RBM to obtain the following molar ratios: 0:1, 10:1, 30:1, 50:1. To quantify miRNA complexation, 100 μl of 200-fold diluted Quant-iT™, RiboGreen Reagent solution was added. Fluorescence was measured using a fluorescence plate reader (SpectraMax) at excitation and emission wavelengths of 500 nm and 525 nm, respectively. Complexed miRNA was quantified using a miRNA standard. Results are presented as mean sd (n=3).

RNA Protection Assay

For RNA protection assay, nanoplexes of CXCR4-scFv-RBM/miR-127 with molar ratios of 0:1, 10:1, 30:1, 50:1 were incubated with or without RNase A/T1 mix at 37° C. for 1 h. Samples were then incubated with 2IU of heparin at room temperature for 30 min to release the miRNA from the nanoplexes. The released miRNA was measured by the RiboGreen method as previously described. Results are presented as mean±sd (n=3).

Western Blot

To determine the effect of miR-127 on JNK kinase, a western blot was performed. A Bradford protein assay (BioRad) was used to quantify the protein amount of the cell lysate. The cell lysate was separated on a 4-12% NuPAGE Bis-Tris Gel (Invitrogen, Carlsbad, CA) for 1.5 h at 150 V. Protein was then wet-transferred to a PVDF membrane for 2 h at 100 V. The membrane was washed with Tris-buffered saline containing 0.05% tween 20 (TBST), followed by blocking with 5% (w/v) dried milk in TBST for 1 h. The PVDF membrane was incubated with an antibody against JNK kinase and phosphorylated INK kinase (phospho-SAPK/JNK (Thr183/Tyr185), catalog #: 4668; SAPK/JNK, catalog #: 9252, Cell Signaling Technology, Danvers, MA) at a 1:1000 dilution in TBST/BSA buffer overnight at 4° C. After incubation with anti-rabbit HRP secondary antibody (#7074, Cell Signaling Technology, Danvers, MA) at 1:5000 dilution for 1 h at RT and thorough washing, ECL substrate was added. All samples were normalized to GAPDH (catalog number: 5174, Cell Signaling Technology, Danvers, MA). Images were acquired using a BioRad ChemiDoc imager.

Tumor Inoculation of 4T1 Cells into Mammary Fat Pad and Tumor Growth Measurements Surgery was performed under sterile conditions. BALB/c mice were anesthetized and their underbellies were shaved, cleaned, and sanitized. A 10 mm incision was made on the mouse's right side next to the mammary fat pad. A wet cotton-swab was inserted into the incision to create a pocket of space to access the mammary fat pad. The mammary fat pad was injected with ice-cold 4T1 cells suspended in Matrigel at 500,000 cells per 100 μL. Tumors were measured in three dimensions with calipers to calculate tumor volume. Therapy was started 4 days after tumor inoculation, when the primary tumor volume was ~65 mm$^3$. Mice were sacrificed on day 12 and the tumor was harvested for final measurement.

Results

Identification and characterization of an scFv that binds to the CXCR4 N-terminal domain. We used a phage library expressing human scFvs to select for an scFv with high affinity to the CXCR4 N-terminal domain (FIG. 2A). The CXCR4-scFv was recombinantly expressed in E. coli and displayed a molecular weight of approximately 28 kDa with high purity as shown by SDS-PAGE gel analysis (FIG. 2B). The CXCR4-scFv bound to CXCR4$^+$ RAW 264.7 mouse macrophages and CXCR4$^+$ MDA-MB-231 human breast cancer cells, indicating species cross-reactivity. The CXCR4-scFv showed no binding to CXCR4$^-$ HEK cells (FIG. 2C-F). These results were further confirmed by fluorescent imaging (FIG. 2G).

Figure 11:
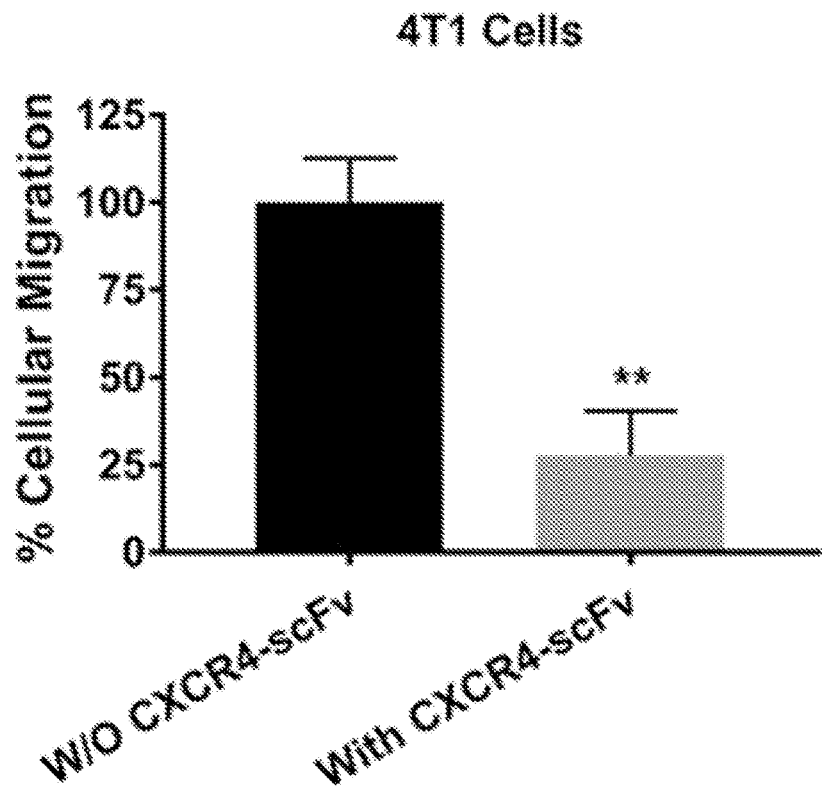
FIG. 11. CXCR4-scFv inhibits the migration of 4T1 breast cancer cells. Serum-starved 4T1 cells were treated with 1000 nM CXCR4-scFv and plated into the apical chamber of a 96-transwell plate that contains CXCL12 (12.5 nM) in the basolateral chamber. After 24 h of incubation, the cells were detached from the bottom of the membrane and analyzed using fluorimetric measurements according to the instructions provided. Data are presented as mean±sd (n=3), **p<0.01 using Student's t test.
Figure 12:
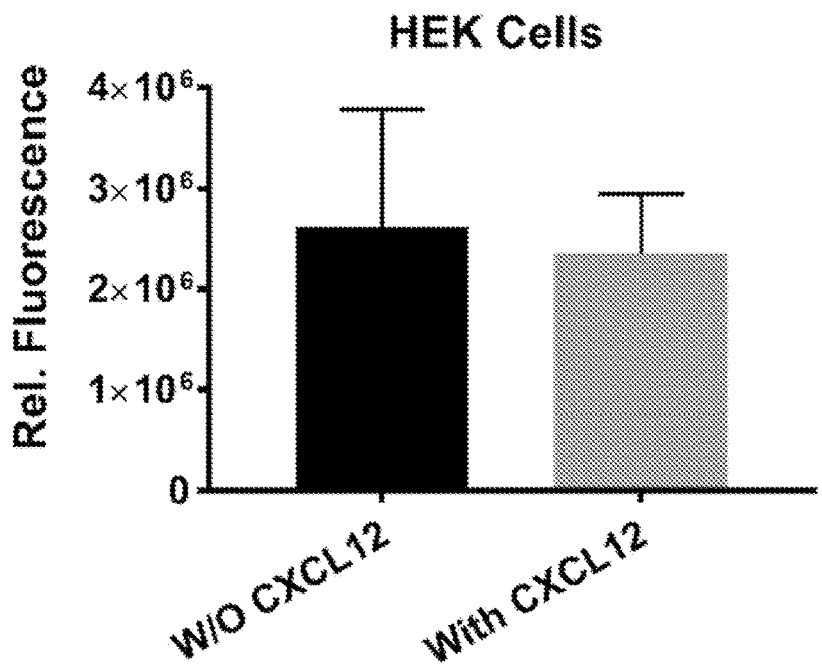
FIG. 12. A chemotaxis migration assay of HEK cells in the presence and absence of CXCL12. No increased migration of CXCR4-negative HEK cells were observed in the presence of CXCL12. Cells were either untreated (no CXCL12) or induced to migrate with CXCL12 (12.5 nM) in the basolateral chamber. Cells were serum starved for 24 h and then plated into the apical chamber of a transwell plate (75,000 cells/well). After 4 h of incubation fluorimetric measurements were performed to quantify cellular migration.

CXCR4-scFv inhibits migration of RAW 264.7 macrophages and MDA-MB-231 breast cancer cells. Migration of CXCR4-positive macrophages and cancer cells are major contributors to tumor growth and metastatic spread. We therefore performed a migration assay with CXCL12 as a chemoattractant and anti-CXCR4 scFv as the antagonist. Following incubation with CXCR4-scFv, the migration of RAW 264.7 was inhibited in the nanomolar range (IC$_{50}$104 nM). Furthermore, CXCR4-scFv inhibited both the migration of human MDA-MB-231 breast cancer cells (IC$_{50}$111 nM) FIG. 3) and murine 4T1 breast cancer cells (FIG. 11). HEK cells did not migrate in the presence of CXCL12 due to a lack of CXCR4 expression (FIG. 12).

Figure 13:
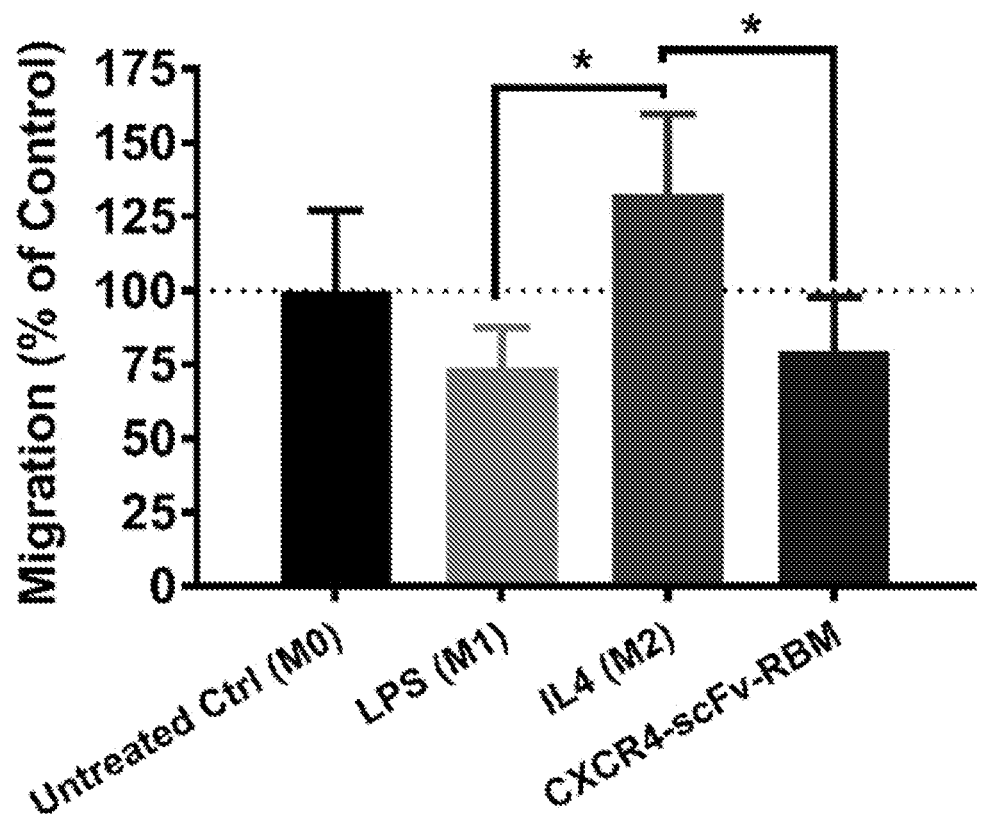
FIG. 13. A chemotaxis migration assay of macrophages polarized with CXCR4-scFv. A chemotaxis cell migration assay was used to assess the effects of the CXCR4-scFv on the cellular migration of RAW 264.7 macrophages. The migration of untreated M0 macrophages, M1 macrophages (treated with LPS), and M2 macrophages (treated with IL4) served as comparisons. Cells were polarized with either IL4 (M2), LPS (M1), or CXCR4-scFv-RBM for 24 hours. After 24 hours, cells were detached and then plated onto the apical membrane of the transwells that contain CXCL12 in the basolateral chamber. After 4 h of incubation, fluorimetric measurements were performed to quantify cellular migration. Data are presented as mean±sd (n=3), *p<0.05 by one-way ANOVA followed by Tukey's post-test.

CXCR4-scFv induces tumor-suppressive M1 macrophage polarization. CXCL12 has been shown to upregulate macrophage M2 genes. Using RT-PCR, we analyzed the M1 markers iNOS (Nos2) and Il6 and M2 markers Arg1 and Mgl2 to assess macrophage phenotype following incubation with CXCR4-targeting scFv (FIG. 4A). Treating macrophages with the CXCR4-scFv significantly upregulated M1 genes and downregulated M2 genes compared to control (FIG. 4B). The M1:M2 gene ratio was used as an indicator of the macrophage phenotype, with a positive M1/M2 value indicating an M1 phenotype and a negative M1/M2 ratio indicating an M2 phenotype. There was a robust increase in all M1/M2 ratios compared to control, indicating a phenotypic switch from the tumor-promoting M2 to the tumoricidal M1 phenotype (FIG. 4C). Remarkably, when macrophages were polarized to the M1 phenotype, their migration decreased by ~60% compared to the migration of M2 macrophages (FIG. 13).

Figure 5:
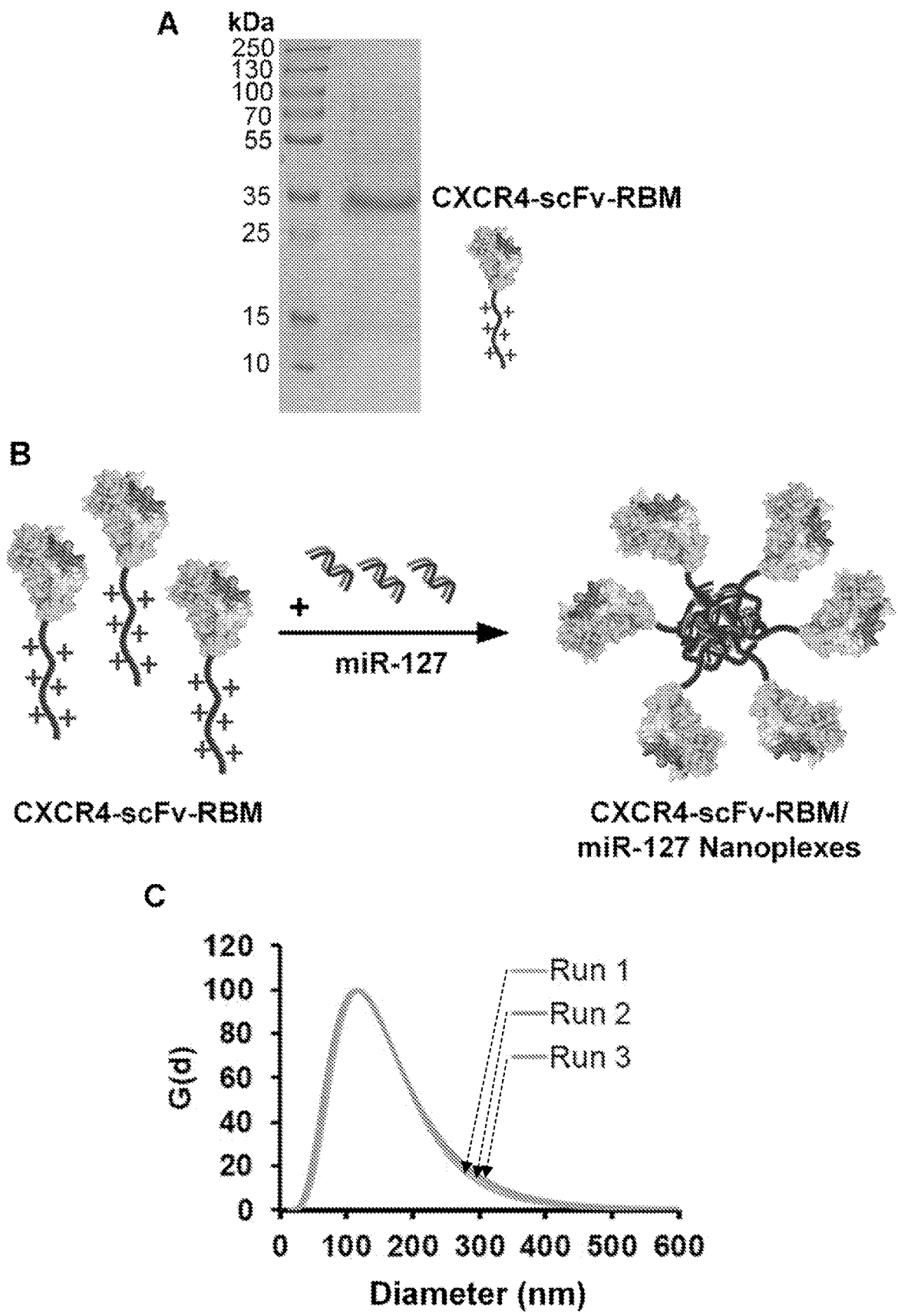
FIG. 5. (A) SDS-PAGE of purified CXCR4-scFv-RBM (MW approx. 32.3 kDa) on a 12% gel: ladder (lane 1), CXCR4-scFv-RBM (lane 2). (B) Schematics of CXCR4-scFv-RBM/miR-127 nanoplexes, (C, D) Hydrodynamic diameter and zeta potential of CXCR4-scFv-RBM/miR-127 nanoplexes.

Hydrodynamic diameter, zeta potential, and stability of CXCR4-scFv-RBM/miR-127 nanoplexes. To generate protein/miRNA nanoplexes, we recombinantly expressed CXCR4-scFv fused to protamine as the RBM. The resulting CXCR4-scFv-RBM fusion protein has a molecular weight of ~32.3 kDa as shown by SDS-PAGE analysis (FIG. 5A). To determine the hydrodynamic diameter, miR-127 was mixed with CXCR4-scFv-RBM at a 1:50 ratio, and small protein-RNA complexes were formed with a hydrodynamic diameter of 116.4±2.7 nm (FIG. 5B, C). The zeta potential of the CXCR4-scFv-RBM alone was slightly positively charged (4.8±0.9 mV). When CXCR4-scFv-RBM was mixed with negatively charged miR-127 to form nanoplexes, the zeta potential decreased to −0.5±3.3 mV (FIG. 5D).

Figure 6:
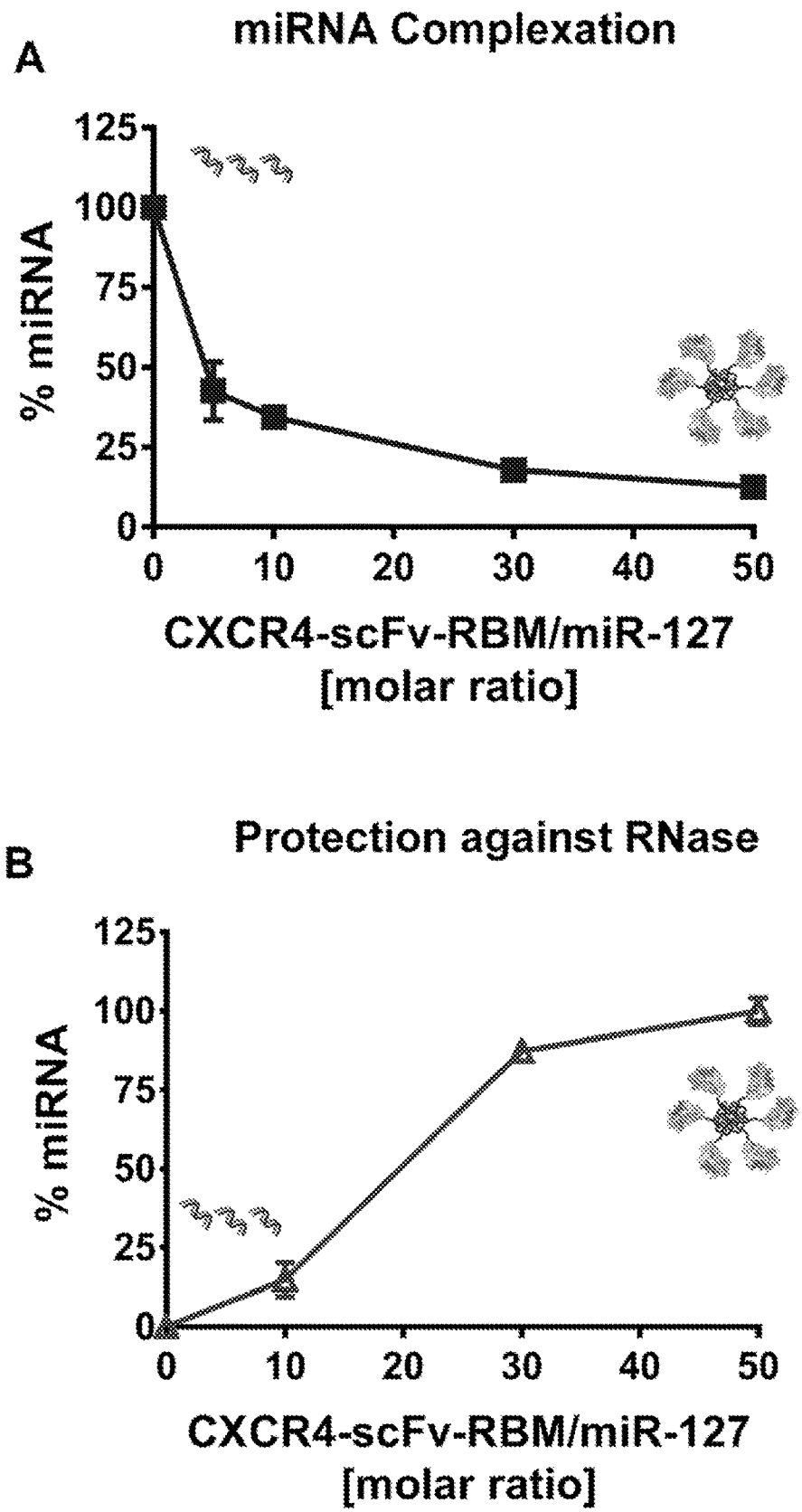
FIG. 6. (A) miR-127 was complexed with increasing amounts of CXCR4-scFv-RBM and free, uncomplexed miRNA was quantified using a RiboGreen intercalation assay. (B) CXCR4-scFv-RBM protects miR-127 against RNase degradation at 30:1 and 50:1 molar ratios.

To determine the optimal amount of CXCR4-scFv-RBM to complex miRNA, we performed a RiboGreen intercalation assay, in which high RiboGreen fluorescence indicates weak miRNA complexation with CXCR4-scFv-RBM and vice versa (FIG. 6). Stable CXCR4-scFv-RBM/miRNA nanoplexes are desired since these protect miRNAs against degradative enzymes. Increasing amounts of CXCR4-scFv-RBM complexed more miR-127, with a 50:1 molar ratio of CXCR4-scFv-RBM/miR-127 providing the strongest complexation of miRNA.

We next tested the stability of the CXCR4-scFv-RBM/miRNA nanoplexes in the presence of RNase using molar ratios of 10:1, 30:1 and 50:1 (CXCR4-scFv-RBM/miR-127). After incubation with heparin to release miRNA from the nanoplexes, intact miRNA was quantified using the RiboGreen intercalation assay. In contrast to free miRNA, miRNA complexed by CXCR4-scFv-RBM was protected from degradation through RNases. Almost 100% of the miRNA remained intact when protected in the CXCR4-scFv-RBM nanoplex, whereas a major fraction of naked miRNA was degraded within 1 h.

Figure 7:
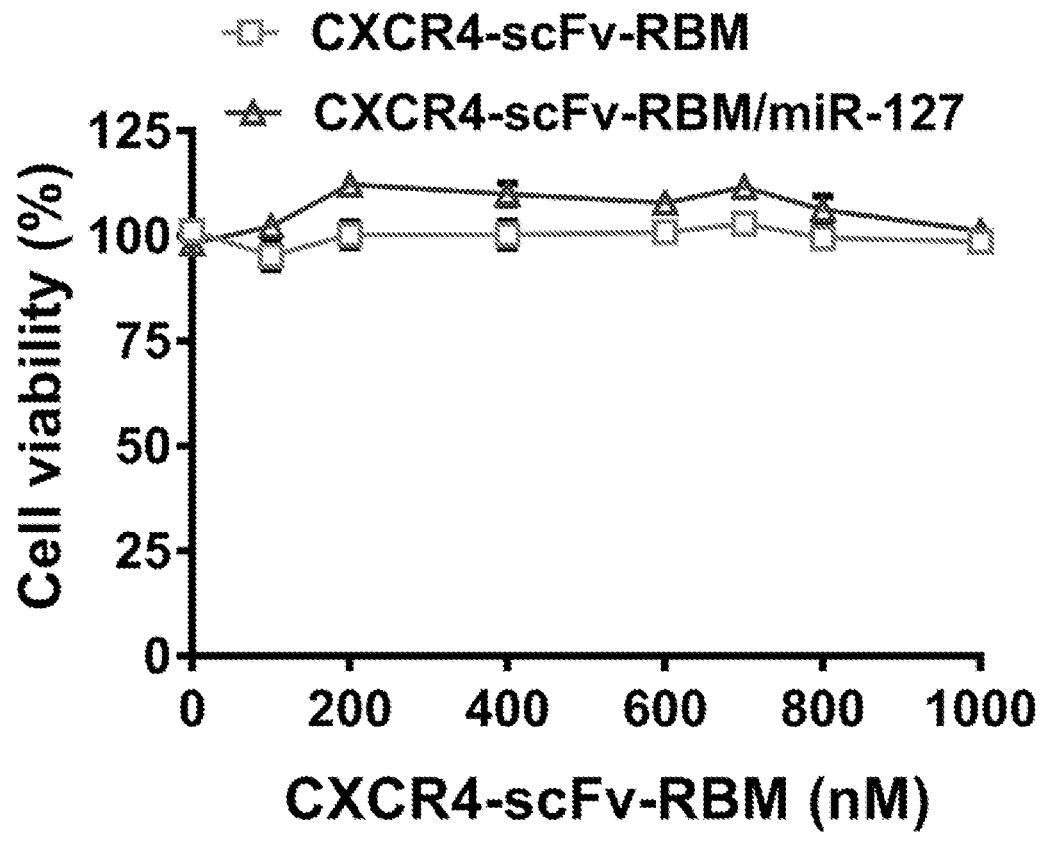

Cytotoxicity. To assess the biocompatibility of CXCR4-scFv-RBM and CXCR4-scFv-RBM/miR-127 nanoplexes, RAW 264.7 macrophages were treated with increasing concentrations of CXCR4-scFv-RBM and CXCR4-scFv-RBM/miR-127. Both CXCR4-scFv-RBM and CXCR4-scFv-RBM/miR-127 were non-toxic, even at the highest concentration tested (1000 nM) (FIG. 7).

Figure 8:
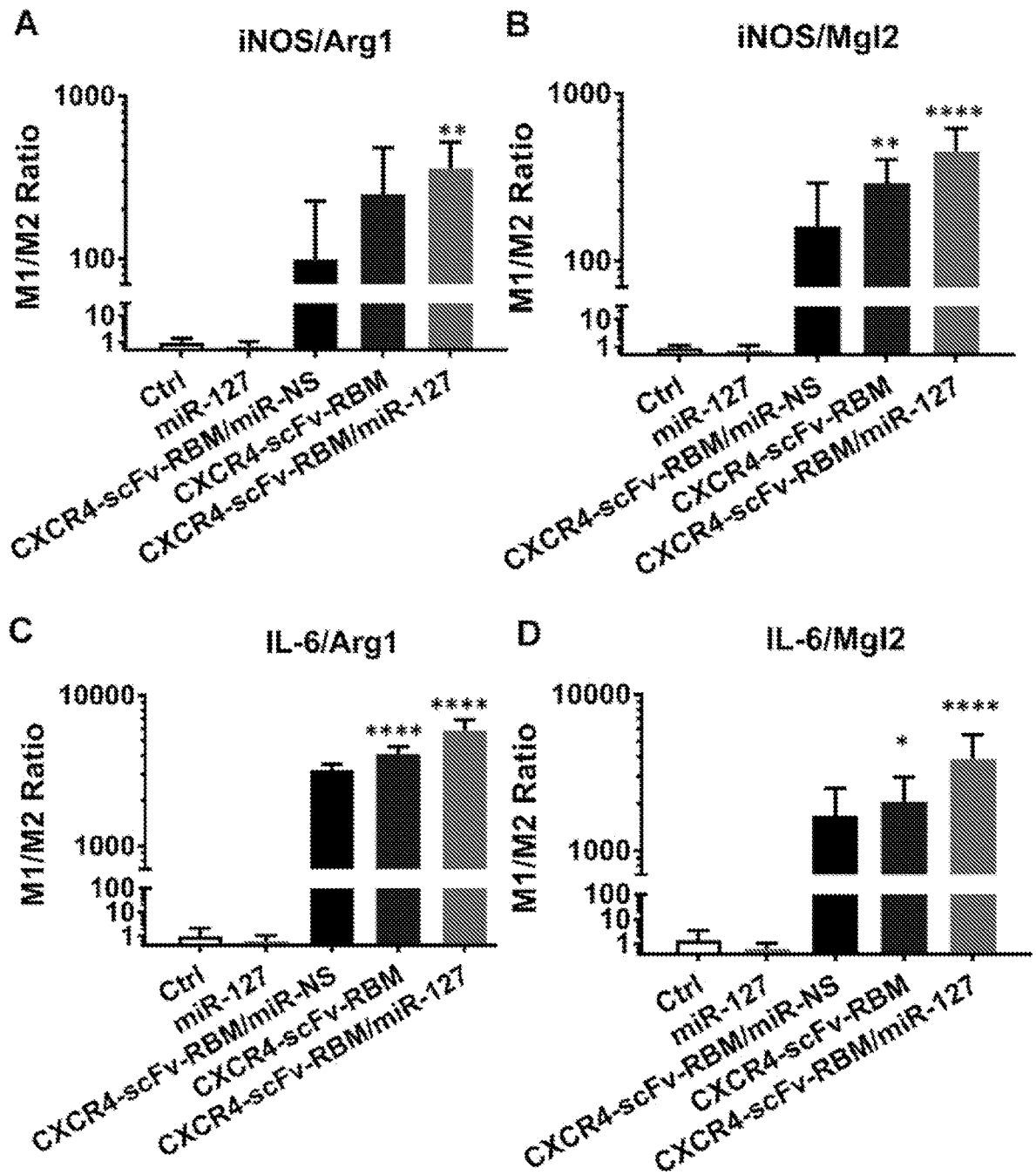
FIG. 8. (A-D) CXCR4-scFv-RBM/miR-127 nanoplexes polarize BMDMs to the tumor-suppressive M1 phenotype as shown in the M1/M2 ratio. (E-G) Immunofluorescent staining shows that BMDMs treated with CXCR4-scFv-RBM/miR127 nanoplexes adopt a more spherical shape and show high expression of the M1 marker iNOS (red), similar to the M1 stimulator LPS. In contrast M2 polarized macrophages (stimulated with IL-4) become elongated and stain positive for CD206 (M2 marker), scale bar ~50 µm. Data are presented as mean±sd (n=7) with *p<0.05, p<0.01, **p<0.0001 by One-Way Anova followed by Tukey's post-test. Asterisks indicate statistical significance compared to ctrl and miR-127. Nuclei=DAPI, green=CD206 (M2 marker), red=iNOS (M1 marker).
Figure 8:
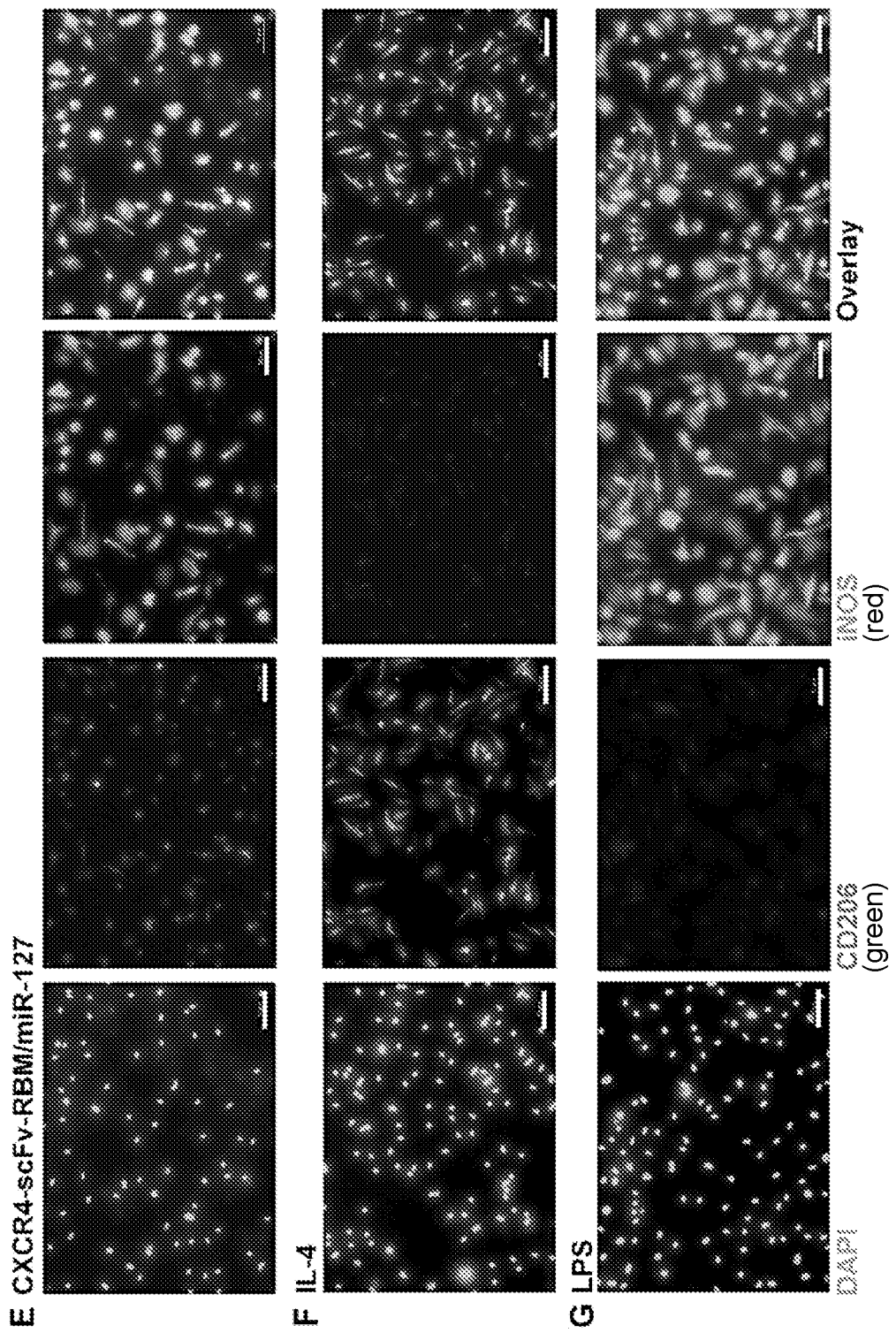
Figure 14:
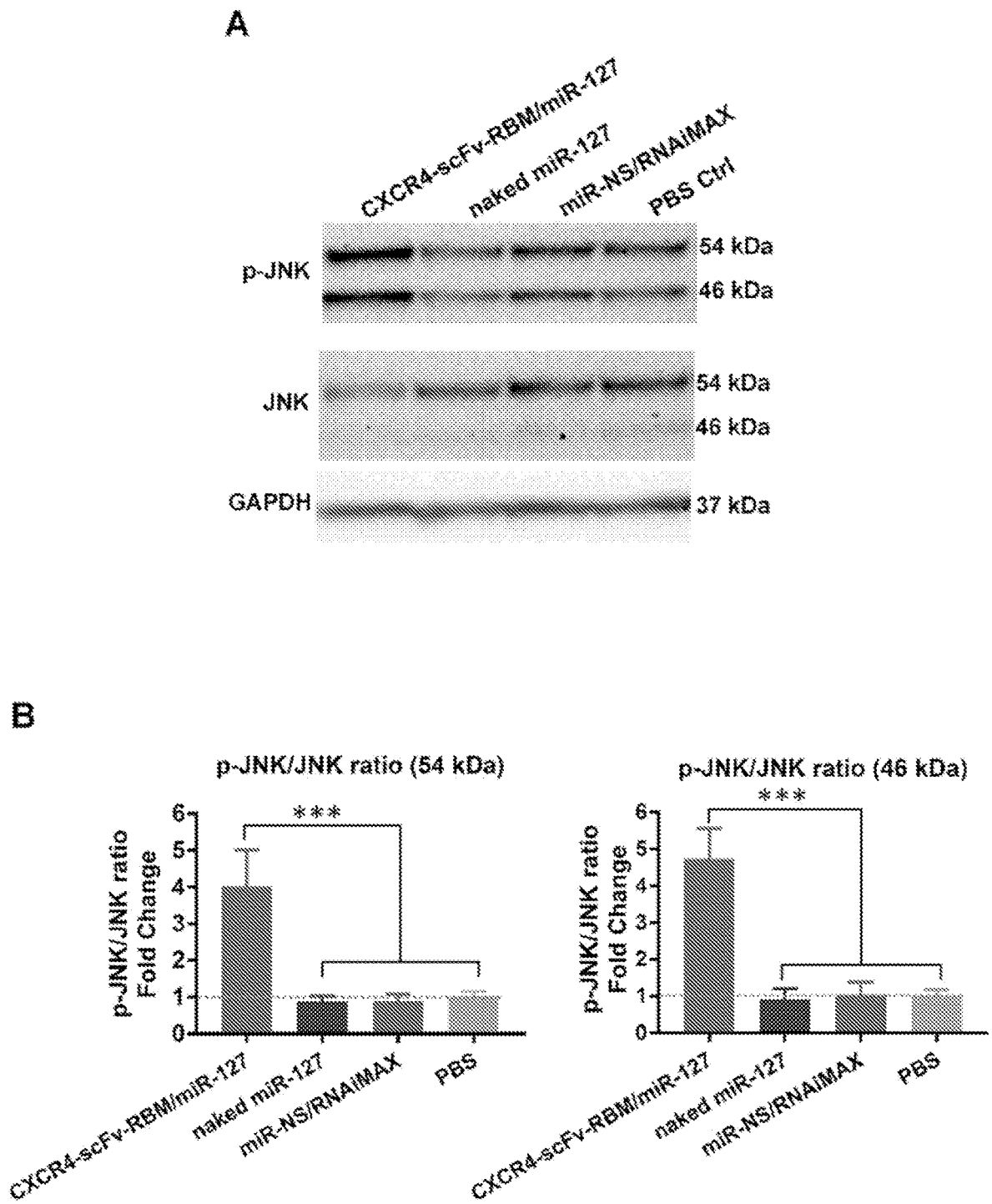
FIG. 14. CXCR4-scFv-RBM/miR-127 significantly upregulates phosphorylated JNK kinase (p-JNK) compared to naked miR-127 and controls. RAW 264.7 cells were treated with CXCR4-scFv-RBM/miR-127 (lane 1), naked miR-127 (lane 2), miR-NS/RNAiMAX (lane 3), and PBS (lane 4). (A) Representative western blots of phosphorylated JNK kinase (p-JNK), JNK kinase (JNK), and GAPH (loading control) are shown. (B) Quantification of the p-JNK/JNK ratio of RAW 264.7 cells treated with CXCR4-scFv-miR-127 and naked miR-127 expressed as fold change compared to the PBS control. miR-NS transfected with RNAiMAX served as a negative control (miR-NS=non-specific miRNA control). Data are presented as mean±sd (n=3), ***$p<0.001$ by one-way ANOVA followed by Tukey's post-test.

Polarization of macrophages to the M1-like phenotype through co-delivery of miR-127. To further enhance MI macrophage polarization, the CXCR4-scFv-RBM fusion protein was used to deliver miRNA-127. miR-127 has been shown to upregulate phosphorylated JNK kinase to downregulate M2-related cytokines and upregulate MI pro-inflammatory cytokines. When macrophages were treated with CXCR4-scFv-RBM/miR-127 nanoplexes an upregulation in phosphorylated JNK kinase was found (FIG. 14). Naked miR-127 did not induce an upregulation in phosphorylated JNK kinase. M1/M2 ratios were used to evaluate the effect of nanoplexes on the macrophage phenotype (FIG. 8). Strikingly, CXCR4-scFv-RBM alone showed strong pharmacological effects and induced a ~250-fold upregulation of iNOS/Arg1, a ~290-fold upregulation of iNOS/Mgl2, ~2600-fold upregulation of IL-6/Arg1, and ~2000-fold upregulation of IL-6/Mgl2 ratios compared to non-treated BMDMs. These effects were further improved when BMDMs were treated with nanoplexes formed from CXCR4-scFv-RBM mixed with miR-127. In general, the CXCR4-scFv-RBM/miR-127 nanoplexes significantly upregulated M1 genes and downregulated M2 genes compared to control cells and induced a 360- and 450-fold enhancement with regard to the iNOS/Arg1 and iNOS/Mgl2 ratios and a 3800-fold and 4500-fold enhancement with regard to the IL-6/Arg1 and IL-6/Mgl2 ratios compared to non-treated cells and naked miR-127. CXCR4-scFv-RBM/miR-127 nanoplexes induced stronger macrophage polarization to the tumor-suppressive M1-like phenotype than each component alone. Macrophage polarization was further confirmed by immunofluorescent staining. BMDMs treated with IL-4 stained only with the CD206 M2 marker (green), whereas BMDMs treated with CXCR4-scFv-RBM and CXCR4-scFv-RBM/miR-127 nanoplexes stained only with the iNOS MI marker (red). LPS, an M1 stimulator, served as positive control.

Figure 9:
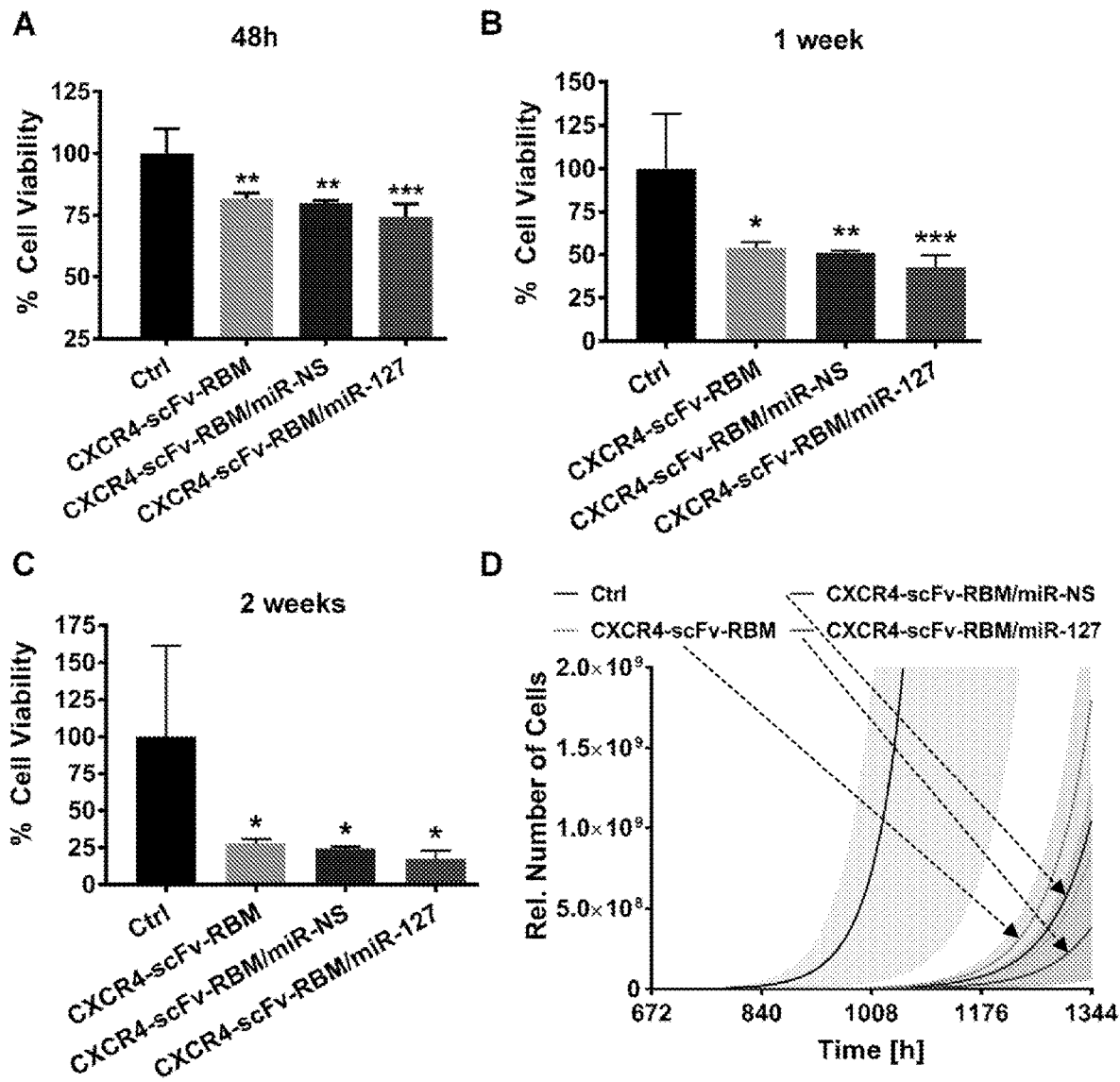
FIG. 9. (A) Effects of conditioned media from CXCR4-scFv-RBM/miR-127-polarized BMDMs on MDA-MB-231 cell viability. (B, C) Projected cell viability of MDA-MB-231 cells treated with conditioned media after 1 week and 2 weeks. (D) Projected cell viability of MDA-MB-231 cells treated with conditioned media over a period of 8 weeks. Data are presented as mean±range with *p<0.05, p<0.01, *p<0.001 by One-Way Anova followed by Dunnett's post-test. Asterisks indicate statistical significance compared to control cells.

Effects of conditioned media from CXCR4-scFv-RBM/miR-127-polarized macrophages on MDA-MB-231 cell proliferation. The effects of media conditioned by macrophages treated with CXCR4-scFv-RBM on cellular proliferation of MDA-MB-231 breast cancer cells was examined with the MTT assay (FIG. 9). Conditioned media from M1-polarized macrophages treated with CXCR4-scFv-RBM/miR-127 decreased cell viability of MDA-MB-231 cells by ~25% (FIG. 9A). Since the 25% decrease in cell viability was observed after only 48 h of treatment with the cell culture supernatant from macrophages treated with CXCR4-scFv-RBM/miR-127 compared to control MDA-MB-231 cells, we simulated the cumulative influence of CXCR4-scFv-RBM/miR-127 conditioned BMDM media on MDA-MB-231 cells over 8 weeks to demonstrate that these effects, being a rate process, can compound over time. After 2 weeks, we simulated a ~80% decrease in the number of viable MDA-MB-231 cells. After 8 weeks, a ~99% reduction in the number of viable MDA-MB-231 cells were predicted (FIG. 9D).

Figure 10:
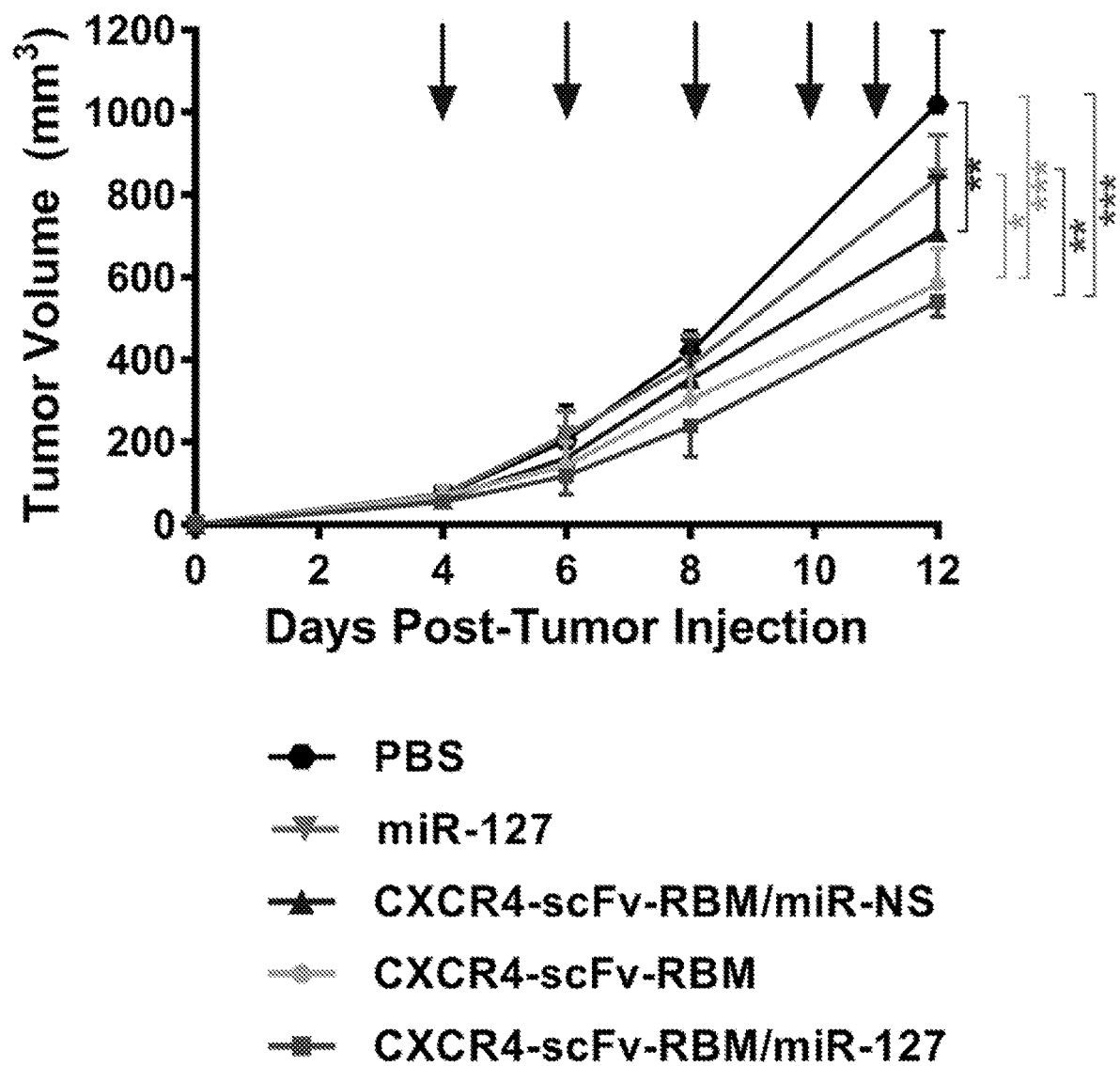
FIG. 10. Effect of CXCR4-scFv-RBM/miR-127 nanoplexes on tumor growth in a triple-negative breast cancer mouse model. Tumor size of 4T1-tumored BALB/C mice treated with PBS, miR-127, CXCR4-scFv-RBM, CXCR4-scFv-RBM/miR-NS, and CXCR4-scFv-RBM/miR-127. The CXCR4-scFv-RBM was dosed at 1 mg/kg of protein and 0.00675 mg/kg of miRNA. Naked miR-127 was dosed at 0.00675 mg/kg. Black arrows indicate time of dosing. Data are represented as mean±sd (n=4), *p<0.05, p<0.01, and *p<0.001 by one-way ANOVA followed by Tukey's post-test.

Effects of CXCR4-scFv-RBM/miR-127 nanoplexes on tumor growth. To assess the anti-tumor effects of CXCR4-scFv-RBM/miR-127 in proof-of-concept studies, BALB/c mice were tumored with 4T1 murine triple negative breast cancer cells in the mammary fat pad. To assess the effects of the CXCR4-scFv-RBM/miR-127 nanoplexes on tumor growth, animals were split into 5 groups (n=4) and treated with (1) PBS, (2) naked miR-127, (3) CXCR4-scFv-RBM/miR-NS nanoplexes, (4) CXCR4-scFv-RBM/miR-127 nanoplexes, and (5) CXCR4-scFv-RBM. The tumor volume was monitored over the course of the study and we observed significant reduction in tumor volume upon treatment with CXCR4-scFv-RBM/miR-127 nanoplexes (FIG. 10). The mice treated with CXCR4-scFv-RBM/miR-127 nanoplexes demonstrated significant reduction in tumor volume by ~2-fold compared to the PBS control group and by ~1.5-fold compared to naked miR-127. The CXCR4-scFv-RBM/miR-NS nanoplexes and CXCR4-scFv-RBM also inhibited tumor growth, albeit to a lesser degree than the CXCR4-scFv-RBM/miR-127 nanoplexes.

Discussion

We have identified a targeting ligand that not only mediated binding to CXCR4 but itself acted as a pharmacological agent and polarized macrophages to the tumoricial M1 phenotype. This CXCR4-scFv significantly increased M1 markers and decreased M2 markers. Further, the CXCR4-scFv was also able to inhibit migration of breast cancer cells and macrophages by ~75%. To further increase the pharmacological effects of the CXCR4-scFv-RBM, we co-delivered miR-127, a miRNA that has been shown to downregulate cytokines associated with a macrophage M2 phenotype and upregulate pro-inflammatory cytokines associated with an M1 phenotype. This combination is attractive, because it modulates M1 macrophage polarization through two distinct targets. The CXCR4-scFv-RBM modulates macrophage polarization by binding to the cell surface receptor CXCR4, while miR-127 exerts its effects through intracellular targets. When CXCR4-scFv-RBM and miR-127 were co-delivered, the combined effect on M1 macrophage polarization was enhanced compared to the administration of each agent alone. Unlike many other carriers that display poor drug loading as measured by % w/w, ~90% w/w of the CXCR4-scFv-RBM is a therapeutic drug. Of the ~32.3 kDa CXCR4-scFv-RBM only the 3 kDa RBM (~9% w/w) is not pharmacologically active but serves as a carrier for the therapeutically active miR-127. This is an important factor, as inefficient drug loading or a carrier with low drug loading capacity can limit the total dose of therapeutic that can be administered and can also cause undesired carrier-induced toxicities. In contrast, the CXCR4-scFv-RBM fusion protein not only served as a carrier for miRNAs and as a CXCR4-targeting ligand, but it in itself has pharmacological effects by polarizing macrophages to tumoricidal M1 macrophages. Unlike our carrier that itself has pharmacological activity, many types of polymeric, peptide-based, and lipidic-based carriers are not bioactive and have drug loading that is less than 10%. Thus, over 90% of the material administered is usually therapeutically inactive and might cause systemic toxicity and unwanted immune response. This is especially concerning when the material does not degrade and as a result accumulates in organs and/or requires extensive metabolism.

To demonstrate that the M1-like state of macrophages induced by the CXCR4-scFv-RBM/miR-127 nanoplexes is indeed suppressive towards cancer cells, we incubated MDA-MB-231 cells with media conditioned by macrophages treated with CXCR4-scFv-RBM/miR-127 nanoplexes. In line with the M1 phenotype, conditioned media from macrophages treated with CXCR4-scFv-RBM/miR-127 nanoplexes markedly decreased MDA-MB-231 cell viability compared to cells treated with conditioned media from macrophages when projected over an 8-week period. Finally, in a proof-of-concept study CXCR4-scFv-RBM/miR-127 nanoplexes significantly inhibited tumor growth compared to mice treated with PBS or miR-127 alone in a triple-negative breast cancer tumor mouse model.

In this disclosure, we have presented a novel carrier-free protein-based therapeutic that not only serves as a targeting ligand and nucleic acid carrier but also has intrinsic pharmacological activity capable of polarizing macrophages to cancer cell-suppressors through CXCR4 antagonism and miR-127 delivery. This is further supported by the fact, that conditioned media from BMDMs treated with CXCR4-scFv-RBM/miR-127 nanoplexes significantly decreased cellular proliferation and survival of MDA-MB-231 breast cancer cells. Since CXCR4-scFv-RBM/miR-127 nanoplexes are designed to target macrophages and CXCR4-positive cancer cells and display no toxicity, they are ideally suited for administration as an adjuvant therapy together with existing clinically approved chemotherapeutics.

Although the present disclosure has been described using specific embodiments and examples, routine modifications will be apparent to those skilled in the art and such modifications are intended to be within the scope of the disclosure and the claims.

What is claimed is:

1. An antibody that is specific for the N-terminal domain of CXCR4 comprising a variable light chain (VL) and a variable heavy chain (VH) wherein:
   a) the VL comprises CDRLI denoted by the sequence SGSSSNIGSNYVY (SEQ ID NO: 5), CDRL2, denoted by the sequence RNNQRPS (SEQ ID NO:20), and CDRL3, denoted by the sequence AAWDDSLNGVV (SEQ ID NO:21), and the VH comprises CDRH1, denoted by the sequence NFYIH (SEQ ID NO:6), CDRH2, denoted by the sequence IINPSDGRTTYAQ (SEQ ID NO:22), and CDRH3, denoted by the sequence GGHYSNYFGQPST (SEQ ID NO:23);
   b) the VL comprises CDRLI denoted by the sequence SGSSSNIGSNYVY (SEQ ID NO: 5), CDRL2, denoted by the sequence RNNQRPS (SEQ ID NO:20), and CDRL3, denoted by the sequence AAWDDSLSGVI (SEQ ID NO:24), and the VH comprises CDRH1, denoted by the sequence NFYIH (SEQ ID NO:6), CDRH2, denoted by the sequence IINPSDGRTTYAQ (SEQ ID NO:22), and CDRH3, denoted by the sequence GGHYSNYFGQPST (SEQ ID NO:23);
   c) the VL comprises CDRLI denoted by the sequence SGSSSNIGSNYVY (SEQ ID NO: 5), CDRL2, denoted by the sequence RNNQRPS (SEQ ID NO:20), and CDRL3, denoted by the sequence ATWDDSLSGVV (SEQ ID NO:25), and the VH comprises CDRH1, denoted by the sequence NFYIH (SEQ ID NO:6), CDRH2, denoted by the sequence IINPSDGRTTYAQ (SEQ ID NO:22), and CDRH3, denoted by the sequence GGHYSNYFGQPST (SEQ ID NO:23); or
   d) the VL comprises CDRLI denoted by the sequence SGSGSNIGSHTVS (SEQ ID NO: 26), CDRL2, denoted by the sequence GNNNRPS (SEQ ID NO:27), and CDRL3, denoted by the sequence ATWDTGPSAVV (SEQ ID NO:28), and the VH comprises CDRH1, denoted by the sequence NFYIH (SEQ ID NO:6), CDRH2, denoted by the sequence IINPSDGRTTYAQ (SEQ ID NO:22), and CDRH3, denoted by the sequence GGHYSNYFGQPST (SEQ ID NO:23).

2. The antibody of claim 1, wherein the antibody has the sequence denoted by SEQ ID No: 1, 2, 3 or 4, or a sequence that is at least 90% identical to SEQ ID NO: 1, 2, 3 or 4.

3. The antibody of claim 1, wherein the antibody is a scFv.

4. A composition comprising the antibody of claim 1.

5. A method for treating an individual afflicted with an immunosuppressive condition comprising administering to the individual a composition comprising an antibody of claim 1.

6. The method of claim 5, wherein the immunosuppressive condition is cancer.

* * * * *

```
SEQUENCE LISTING

<160> NUMBER OF SEQ ID NOS: 29

<210> SEQ ID NO 1
<211> LENGTH: 254
<212> TYPE: PRT
<213> ORGANISM: Artificial Sequence
<220> FEATURE:
<223> OTHER INFORMATION: scFv#a

<400> SEQUENCE: 1

Ser Tyr Glu Leu Thr Gln Pro Pro Ser Ala Ser Gly Thr Pro Gly Gln
1               5                   10                  15

Arg Val Thr Ile Ser Cys Ser Gly Ser Ser Ser Asn Ile Gly Ser Asn
            20                  25                  30

Tyr Val Tyr Trp Tyr Gln Gln Leu Pro Gly Thr Ala Pro Lys Leu Leu
        35                  40                  45

Ile Tyr Arg Asn Asn Gln Arg Pro Ser Gly Val Pro Asp Arg Phe Ser
    50                  55                  60

Gly Ser Lys Ser Gly Thr Ser Ala Ser Leu Ala Ile Ser Gly Leu Arg
65                  70                  75                  80

Ser Glu Asp Glu Ala Asp Tyr Tyr Cys Ala Ala Trp Asp Asp Ser Leu
                85                  90                  95

Asn Gly Val Val Phe Gly Gly Gly Thr Lys Leu Thr Val Leu Gly Glu
            100                 105                 110

Gly Lys Ser Ser Gly Ser Gly Ser Glu Ser Lys Ala Ser Gln Val Thr
        115                 120                 125
```

```
Leu Lys Glu Ser Gly Ala Glu Val Lys Lys Pro Gly Ala Ser Val Lys
        130                 135                 140
Val Ser Cys Lys Ala Ser Gly Tyr Thr Phe Thr Asn Phe Tyr Ile His
145                 150                 155                 160
Trp Val Arg Arg Ala Pro Gly Gln Gly Leu Glu Trp Met Gly Ile Ile
                165                 170                 175
Asn Pro Ser Asp Gly Arg Thr Thr Tyr Ala Gln Lys Phe Gln Gly Arg
            180                 185                 190
Val Thr Met Thr Arg Asp Thr Ser Ser Thr Leu Tyr Met Glu Leu
        195                 200                 205
Thr Ser Leu Arg Ser Glu Asp Thr Ala Val Cys Gly Arg Gly Gly His
        210                 215                 220
Tyr Ser Asn Tyr Phe Gly Gln Pro Ser Thr Trp Gly Gln Gly Thr Leu
225                 230                 235                 240
Val Thr Val Ser Val Glu Ala Ser His His His His His
                245                 250
```

```
<210> SEQ ID NO 2
<211> LENGTH: 256
<212> TYPE: PRT
<213> ORGANISM: Artificial Sequence
<220> FEATURE:
<223> OTHER INFORMATION: scFv#b

<400> SEQUENCE: 2

Gln Ser Val Leu Thr Gln Pro Pro Ser Ala Ser Gly Thr Pro Gly Gln
1               5                   10                  15
Arg Val Thr Ile Ser Cys Ser Gly Ser Ser Asn Ile Gly Ser Asn
            20                  25                  30
Tyr Val Tyr Trp Tyr Gln Gln Leu Pro Gly Thr Ala Pro Lys Leu Leu
        35                  40                  45
Ile Tyr Arg Asn Asn Gln Arg Pro Ser Gly Val Pro Asp Arg Phe Ser
50                  55                  60
Gly Ser Lys Ser Gly Thr Ser Ala Ser Leu Ala Ile Ser Gly Leu Arg
65                  70                  75                  80
Ser Glu Asp Glu Ala Asp Tyr Tyr Cys Ala Ala Trp Asp Asp Ser Leu
                85                  90                  95
Ser Gly Val Ile Phe Gly Gly Gly Thr Lys Leu Thr Val Leu Gly Glu
            100                 105                 110
Gly Lys Ser Ser Gly Ser Gly Ser Glu Ser Lys Ala Ser Gln Val Thr
        115                 120                 125
Leu Lys Glu Ser Gly Ala Glu Val Lys Lys Pro Gly Ala Ser Val Lys
        130                 135                 140
Val Ser Cys Lys Ala Ser Gly Tyr Thr Phe Thr Asn Phe Tyr Ile His
145                 150                 155                 160
Trp Val Arg Arg Ala Pro Gly Gln Gly Leu Glu Trp Met Gly Ile Ile
                165                 170                 175
Asn Pro Ser Asp Gly Arg Thr Thr Tyr Ala Gln Lys Phe Gln Gly Arg
            180                 185                 190
Val Thr Met Thr Arg Asp Thr Ser Ser Thr Leu Tyr Met Glu Leu
        195                 200                 205
Thr Ser Leu Arg Ser Glu Asp Thr Ala Val Tyr Tyr Cys Gly Arg Gly
        210                 215                 220
Gly His Tyr Ser Asn Tyr Phe Gly Gln Pro Ser Thr Trp Gly Gln Gly
225                 230                 235                 240
```

```
Thr Leu Val Thr Val Ser Val Glu Ala Ser His His His His His
                245                 250                 255
```

<210> SEQ ID NO 3
<211> LENGTH: 256
<212> TYPE: PRT
<213> ORGANISM: Artificial Sequence
<220> FEATURE:
<223> OTHER INFORMATION: scFv#c

<400> SEQUENCE: 3

```
Gln Ser Val Leu Thr Gln Pro Pro Ser Ala Ser Gly Thr Pro Gly Gln
1               5                   10                  15

Arg Val Thr Ile Ser Cys Ser Gly Ser Ser Asn Ile Gly Ser Asn
                20                  25                  30

Tyr Val Tyr Trp Tyr Gln Gln Leu Pro Gly Thr Ala Pro Lys Leu Leu
            35                  40                  45

Ile Tyr Arg Asn Asn Gln Arg Pro Ser Gly Val Pro Asp Arg Phe Ser
        50                  55                  60

Gly Ser Lys Ser Gly Thr Ser Ala Ser Leu Ala Ile Ser Gly Leu Arg
65                  70                  75                  80

Ser Glu Asp Glu Gly Asp Tyr Tyr Cys Ala Thr Trp Asp Asp Ser Leu
                85                  90                  95

Ser Gly Val Val Phe Gly Gly Gly Thr Lys Leu Thr Val Leu Gly Glu
            100                 105                 110

Gly Lys Ser Ser Gly Ser Gly Ser Glu Ser Lys Ala Ser Gln Val Thr
        115                 120                 125

Leu Lys Glu Ser Gly Ala Glu Val Lys Lys Pro Gly Ala Ser Val Lys
130                 135                 140

Val Ser Cys Lys Ala Ser Gly Tyr Thr Phe Thr Asn Phe Tyr Ile His
145                 150                 155                 160

Trp Val Arg Arg Ala Pro Gly Gln Gly Leu Glu Trp Met Gly Ile Ile
                165                 170                 175

Asn Pro Ser Asp Gly Arg Thr Thr Tyr Ala Gln Lys Phe Gln Gly Arg
            180                 185                 190

Val Thr Met Thr Arg Asp Thr Ser Thr Ser Thr Leu Tyr Met Glu Leu
        195                 200                 205

Thr Ser Leu Arg Ser Glu Asp Thr Ala Val Tyr Tyr Cys Gly Arg Gly
210                 215                 220

Gly His Tyr Ser Asn Tyr Phe Gly Gln Pro Ser Thr Trp Gly Gln Gly
225                 230                 235                 240

Thr Leu Val Thr Val Ser Val Glu Ala Ser His His His His His
                245                 250                 255
```

<210> SEQ ID NO 4
<211> LENGTH: 256
<212> TYPE: PRT
<213> ORGANISM: Artificial Sequence
<220> FEATURE:
<223> OTHER INFORMATION: scFv#d

<400> SEQUENCE: 4

```
Gln Ser Val Leu Thr Gln Pro Pro Ser Ala Ser Gly Thr Pro Gly Gln
1               5                   10                  15

Gly Ile Thr Ile Ser Cys Ser Gly Ser Gly Ser Asn Ile Gly Ser His
                20                  25                  30

Thr Val Ser Trp Tyr Gln Gln Leu Pro Gly Thr Ala Pro Lys Leu Leu
            35                  40                  45
```

```
Ile Tyr Gly Asn Asn Arg Pro Ser Gly Val Pro Asp Arg Phe Ser
    50                  55                  60
Gly Ser Lys Ser Gly Thr Ser Ala Thr Leu Gly Ile Thr Gly Leu Gln
 65                  70                  75                  80
Thr Gly Asp Asp Ala Asp Tyr Tyr Cys Ala Thr Trp Asp Thr Gly Pro
                 85                  90                  95
Ser Ala Val Val Phe Gly Gly Gly Thr Lys Leu Thr Val Leu Gly Glu
            100                 105                 110
Gly Lys Ser Ser Gly Ser Gly Ser Glu Ser Lys Ala Ser Gln Val Thr
        115                 120                 125
Leu Lys Glu Ser Gly Ala Glu Val Lys Lys Pro Gly Ala Ser Val Lys
    130                 135                 140
Val Ser Cys Lys Ala Ser Gly Tyr Thr Phe Thr Asn Phe Tyr Ile His
145                 150                 155                 160
Trp Val Arg Arg Ala Pro Gly Gln Gly Leu Glu Trp Met Gly Ile Ile
                165                 170                 175
Asn Pro Ser Asp Gly Arg Thr Thr Tyr Ala Gln Lys Phe Gln Gly Arg
            180                 185                 190
Val Thr Met Thr Arg Asp Ala Ser Thr Ser Thr Leu Tyr Met Glu Leu
        195                 200                 205
Thr Ser Leu Arg Ser Glu Asp Thr Ala Val Tyr Tyr Cys Gly Lys Gly
    210                 215                 220
Gly His Tyr Ser Asn Tyr Phe Gly Gln Pro Ser Thr Trp Gly Gln Gly
225                 230                 235                 240
Thr Leu Val Thr Val Ser Val Glu Ala Ser His His His His His His
                245                 250                 255

<210> SEQ ID NO 5
<211> LENGTH: 13
<212> TYPE: PRT
<213> ORGANISM: Artificial Sequence
<220> FEATURE:
<223> OTHER INFORMATION: CDR

<400> SEQUENCE: 5

Ser Gly Ser Ser Asn Ile Gly Ser Asn Tyr Val Tyr
1               5                   10

<210> SEQ ID NO 6
<211> LENGTH: 5
<212> TYPE: PRT
<213> ORGANISM: Artificial Sequence
<220> FEATURE:
<223> OTHER INFORMATION: CDR

<400> SEQUENCE: 6

Asn Phe Tyr Ile His
1               5

<210> SEQ ID NO 7
<211> LENGTH: 22
<212> TYPE: PRT
<213> ORGANISM: Artificial Sequence
<220> FEATURE:
<223> OTHER INFORMATION: protamine RBM peptide

<400> SEQUENCE: 7

Arg Ser Gln Ser Arg Ser Arg Tyr Tyr Arg Gln Arg Gln Arg Ser Arg
1               5                   10                  15
```

Arg Arg Arg Arg Arg Ser
              20

<210> SEQ ID NO 8
<211> LENGTH: 297
<212> TYPE: PRT
<213> ORGANISM: Artificial Sequence
<220> FEATURE:
<223> OTHER INFORMATION: anti-CXCR4 scFv#c and protamine RBM peptide
      fusion protein

<400> SEQUENCE: 8

Met Leu Gln Ser Val Leu Thr Gln Pro Pro Ser Ala Ser Gly Thr Pro
1               5                   10                  15

Gly Gln Arg Val Thr Ile Ser Cys Ser Gly Ser Ser Ser Asn Ile Gly
                20                  25                  30

Ser Asn Tyr Val Tyr Trp Tyr Gln Gln Leu Pro Gly Thr Ala Pro Lys
            35                  40                  45

Leu Leu Ile Tyr Arg Asn Asn Gln Arg Pro Ser Gly Val Pro Asp Arg
        50                  55                  60

Phe Ser Gly Ser Lys Ser Gly Thr Ser Ala Ser Leu Ala Ile Ser Gly
65                  70                  75                  80

Leu Arg Ser Glu Asp Glu Gly Asp Tyr Tyr Cys Ala Thr Trp Asp Asp
                85                  90                  95

Ser Leu Ser Gly Val Val Phe Gly Gly Gly Thr Lys Leu Thr Val Leu
            100                 105                 110

Gly Glu Gly Lys Ser Ser Gly Ser Gly Ser Glu Ser Lys Ala Ser Gln
        115                 120                 125

Val Thr Leu Lys Glu Ser Gly Ala Glu Val Lys Lys Pro Gly Ala Ser
130                 135                 140

Val Lys Val Ser Cys Lys Ala Ser Gly Tyr Thr Phe Thr Asn Phe Tyr
145                 150                 155                 160

Ile His Trp Val Arg Arg Ala Pro Gly Gln Gly Leu Glu Trp Met Gly
                165                 170                 175

Ile Ile Asn Pro Ser Asp Gly Arg Thr Thr Tyr Ala Gln Lys Phe Gln
            180                 185                 190

Gly Arg Val Thr Met Thr Arg Asp Thr Ser Thr Ser Thr Leu Tyr Met
        195                 200                 205

Glu Leu Thr Ser Leu Arg Ser Glu Asp Thr Ala Val Tyr Tyr Cys Gly
210                 215                 220

Arg Gly Gly His Tyr Ser Asn Tyr Phe Gly Gln Pro Ser Thr Trp Gly
225                 230                 235                 240

Gln Gly Thr Leu Val Thr Val Ser Ser Val Asp Gly Gly Gly Gly Ser
                245                 250                 255

Gly Gly Gly Ser Arg Ser Gln Ser Ser Arg Tyr Tyr Arg Gln Arg
        260                 265                 270

Gln Arg Ser Arg Arg Arg Arg Arg Ser Glu Asn Leu Tyr Phe Gln
        275                 280                 285

Gly Leu Glu His His His His His His
        290                 295

<210> SEQ ID NO 9
<211> LENGTH: 46
<212> TYPE: PRT
<213> ORGANISM: Homo sapiens

<400> SEQUENCE: 9

```
Met Glu Pro Ile Ser Ile Tyr Thr Ser Asp Asn Tyr Ser Glu Glu Val
1               5                   10                  15

Gly Ser Gly Asp Tyr Asp Ser Asn Lys Glu Pro Cys Phe Arg Asp Glu
            20                  25                  30

Asn Val His Phe Asn Arg Ile Phe Leu Pro Thr Ile Tyr Phe
            35                  40                  45
```

<210> SEQ ID NO 10
<211> LENGTH: 18
<212> TYPE: DNA
<213> ORGANISM: Artificial Sequence
<220> FEATURE:
<223> OTHER INFORMATION: primer

<400> SEQUENCE: 10
ccctgtatgc ctctggtc                                              18

<210> SEQ ID NO 11
<211> LENGTH: 19
<212> TYPE: DNA
<213> ORGANISM: Artificial Sequence
<220> FEATURE:
<223> OTHER INFORMATION: primer

<400> SEQUENCE: 11
gtctttacgg atgtcaacg                                             19

<210> SEQ ID NO 12
<211> LENGTH: 24
<212> TYPE: DNA
<213> ORGANISM: Artificial Sequence
<220> FEATURE:
<223> OTHER INFORMATION: primer

<400> SEQUENCE: 12
tttgcttcca tgctaatgcg aaag                                       24

<210> SEQ ID NO 13
<211> LENGTH: 25
<212> TYPE: DNA
<213> ORGANISM: Artificial Sequence
<220> FEATURE:
<223> OTHER INFORMATION: primer

<400> SEQUENCE: 13
gctctgttga ggtctaaagg ctccg                                      25

<210> SEQ ID NO 14
<211> LENGTH: 20
<212> TYPE: DNA
<213> ORGANISM: Artificial Sequence
<220> FEATURE:
<223> OTHER INFORMATION: primer

<400> SEQUENCE: 14
tgggaaatcg tggaaatgag                                            20

<210> SEQ ID NO 15
<211> LENGTH: 21
<212> TYPE: DNA
<213> ORGANISM: Artificial Sequence
<220> FEATURE:
<223> OTHER INFORMATION: primer

<400> SEQUENCE: 15

```
ctgaaggact ctggctttgt c                                              21
```

<210> SEQ ID NO 16
<211> LENGTH: 20
<212> TYPE: DNA
<213> ORGANISM: Artificial Sequence
<220> FEATURE:
<223> OTHER INFORMATION: primer

<400> SEQUENCE: 16

```
cagaagaatg gaagagtcag                                                20
```

<210> SEQ ID NO 17
<211> LENGTH: 20
<212> TYPE: DNA
<213> ORGANISM: Artificial Sequence
<220> FEATURE:
<223> OTHER INFORMATION: primer

<400> SEQUENCE: 17

```
cagatatgca gggagtcacc                                                20
```

<210> SEQ ID NO 18
<211> LENGTH: 22
<212> TYPE: DNA
<213> ORGANISM: Artificial Sequence
<220> FEATURE:
<223> OTHER INFORMATION: primer

<400> SEQUENCE: 18

```
aaaaccagga gatgagaaat gg                                             22
```

<210> SEQ ID NO 19
<211> LENGTH: 20
<212> TYPE: DNA
<213> ORGANISM: Artificial Sequence
<220> FEATURE:
<223> OTHER INFORMATION: primer

<400> SEQUENCE: 19

```
cggagatgac caccagtagc                                                20
```

<210> SEQ ID NO 20
<211> LENGTH: 7
<212> TYPE: PRT
<213> ORGANISM: Artificial Sequence
<220> FEATURE:
<223> OTHER INFORMATION: CDR

<400> SEQUENCE: 20

Arg Asn Asn Gln Arg Pro Ser
1               5

<210> SEQ ID NO 21
<211> LENGTH: 11
<212> TYPE: PRT
<213> ORGANISM: Artificial Sequence
<220> FEATURE:
<223> OTHER INFORMATION: CDR

<400> SEQUENCE: 21

Ala Ala Trp Asp Asp Ser Leu Asn Gly Val Val
1               5                   10

<210> SEQ ID NO 22
<211> LENGTH: 13

```
<212> TYPE: PRT
<213> ORGANISM: Artificial Sequence
<220> FEATURE:
<223> OTHER INFORMATION: CDR

<400> SEQUENCE: 22

Ile Ile Asn Pro Ser Asp Gly Arg Thr Thr Tyr Ala Gln
1               5                   10

<210> SEQ ID NO 23
<211> LENGTH: 13
<212> TYPE: PRT
<213> ORGANISM: Artificial Sequence
<220> FEATURE:
<223> OTHER INFORMATION: CDR

<400> SEQUENCE: 23

Gly Gly His Tyr Ser Asn Tyr Phe Gly Gln Pro Ser Thr
1               5                   10

<210> SEQ ID NO 24
<211> LENGTH: 11
<212> TYPE: PRT
<213> ORGANISM: Artificial Sequence
<220> FEATURE:
<223> OTHER INFORMATION: CDR

<400> SEQUENCE: 24

Ala Ala Trp Asp Asp Ser Leu Ser Gly Val Ile
1               5                   10

<210> SEQ ID NO 25
<211> LENGTH: 11
<212> TYPE: PRT
<213> ORGANISM: Artificial Sequence
<220> FEATURE:
<223> OTHER INFORMATION: CDR

<400> SEQUENCE: 25

Ala Thr Trp Asp Asp Ser Leu Ser Gly Val Val
1               5                   10

<210> SEQ ID NO 26
<211> LENGTH: 13
<212> TYPE: PRT
<213> ORGANISM: Artificial Sequence
<220> FEATURE:
<223> OTHER INFORMATION: CDR

<400> SEQUENCE: 26

Ser Gly Ser Gly Ser Asn Ile Gly Ser His Thr Val Ser
1               5                   10

<210> SEQ ID NO 27
<211> LENGTH: 7
<212> TYPE: PRT
<213> ORGANISM: Artificial Sequence
<220> FEATURE:
<223> OTHER INFORMATION: CDR

<400> SEQUENCE: 27

Gly Asn Asn Asn Arg Pro Ser
1               5

<210> SEQ ID NO 28
<211> LENGTH: 11
<212> TYPE: PRT
```

```
<213> ORGANISM: Artificial Sequence
<220> FEATURE:
<223> OTHER INFORMATION: CDR

<400> SEQUENCE: 28

Ala Thr Trp Asp Thr Gly Pro Ser Ala Val Val
1               5                   10

<210> SEQ ID NO 29
<211> LENGTH: 12
<212> TYPE: PRT
<213> ORGANISM: Artificial Sequence
<220> FEATURE:
<223> OTHER INFORMATION: TAT derived sequence

<400> SEQUENCE: 29

Gly Arg Lys Lys Arg Arg Gln Arg Arg Pro Gln
1               5                   10
```